United States Patent [19]
Perez

[11] Patent Number: 5,592,666
[45] Date of Patent: Jan. 7, 1997

[54] METHOD AND SYSTEM FOR STORING AND RETRIEVING DATA FROM A MULTIDIMENSIONAL ARRAY USING DATABASE POINTERS

[75] Inventor: Manuel Perez, Berkeley Heights, N.J.

[73] Assignee: Sinper Corporation, Warren, N.J.

[21] Appl. No.: 331,914

[22] Filed: Oct. 31, 1994

[51] Int. Cl.$^6$ .................................................. G06F 12/00
[52] U.S. Cl. ........................... 395/600; 364/DIG. 1; 364/282.1; 364/283.2; 364/247.7
[58] Field of Search ..................................... 395/600, 148; 364/DIG. 1

[56] References Cited

U.S. PATENT DOCUMENTS

| | | | |
|---|---|---|---|
| 5,055,998 | 10/1991 | Wright et al. | 364/200 |
| 5,231,577 | 7/1993 | Koss | 364/419 |
| 5,280,575 | 1/1994 | Young et al. | 395/148 |
| 5,295,261 | 3/1994 | Simonetti | 395/600 |
| 5,317,686 | 5/1994 | Salas et al. | 395/157 |
| 5,319,777 | 6/1994 | Perez | 395/600 |
| 5,359,724 | 10/1994 | Earle | 395/425 |
| 5,404,512 | 4/1995 | Powers et al. | 395/600 |
| 5,467,471 | 11/1995 | Bader | 395/600 |

OTHER PUBLICATIONS

Ralston and Reilly, Editors, *Encyclopedia of Computer Science*, 3d ed., pp. 911–912, 1993.

Primary Examiner—Thomas G. Black
Assistant Examiner—Jean R. Homere
Attorney, Agent, or Firm—Lerner, David, Littenberg, Krumholz & Mentlik

[57] ABSTRACT

A system and method for storing within, and retrieving from, a computer database values of a multidimensional array in which storage locations are allocated within each storage node of the database corresponding to a dimension of the array only for the database-pointers actually stored within the storage node. An indicium is stored with each database-pointer to identify the element of the array's dimension to which the database-pointer corresponds. In an alternative embodiment, a sub-storage area, with sub-storage locations allocated for each of the elements of the dimension to which the storage node corresponds, is associated with each storage node, and an indicium is stored within each sub-storage location indicating whether a database-pointer exists in the associated storage node corresponding to the associated element. A hierarchial table of calculation rules also is provided for determining values which are calculated from other values within the array. Each of the table's rules defines one or more storage locations within the array and provides a formula for calculating the values applicable to those locations.

32 Claims, 11 Drawing Sheets $[a_1, b_1, c_4]$ = FORMULA 1

$[a_1, b_1, c_6]$ = FORMULA 2

$[a_1, b_1, c_9]$ = FORMULA 3

$[a_1, b_1]$ = FORMULA 4

$[a_2, c_4]$ = FORMULA 5

$[a_3, b_6, c_9]$ = FORMULA 6

$[b_4]$ = FORMULA 7

$[c_4]$ = FORMULA 8

METHOD AND SYSTEM FOR STORING AND RETRIEVING DATA FROM A MULTIDIMENSIONAL ARRAY USING DATABASE POINTERS

FIELD OF THE INVENTION

The present invention pertains to methods and apparatus for storing and retrieving data from a computer database and, more particularly, to methods and apparatus for storing and retrieving, from a computer database, data in the format of a multidimensional array.

BACKGROUND OF THE INVENTION

Computer programs which provide spreadsheet functions are extremely popular in today's computer-assisted workplace. The row and column structure of spreadsheet programs provides users an easily understood means for comparing and contrasting numbers and other data.

In order to expand the flexibility and scope of spreadsheet and other analytical programs, and to facilitate multiple-user access, it is known to organize the data for such programs in the format of a multidimensional array, e.g., the orthogonal coordinates or dimensions of perceptible space. For more complicated applications, however, more than three coordinates or dimensions are required. Such an organizational structure is disclosed in my U.S. Pat. No. 5,319,777, the subject matter of which is incorporated herein by reference.

The organizational structure of a multidimensional array is illustrated in FIG. 1. Each value within this structure is uniquely identified by a set of elements. One element is provided for each dimension of the array. The multidimensional array illustrated in FIG. 1 has four dimensions, labeled a, b, c and d in this figure.

For the purpose of this illustration, the values stored within the multidimensional array can be viewed as monetary values representing the monthly budget for the departments of a corporation over several years. The a, b, c, and d dimensions represent, respectively, expense items, months, departments, and years. Each monetary value within the array is assigned a cellular location which is uniquely identified by one element for each dimension. If this same structure were applied to each of a number of subsidiaries of the corporation, five dimensions would be required.

In order to store within a computer's database values organized in the form of a multidimensional array, each potential storage location within the array can be assigned and uniquely identified upon establishing the array. For example, in a three-dimensional array with ten elements for each dimension, one thousand potential storage locations for potential values exist. Upon establishing the multidimensional array within the computer's database, each of these one thousand potential storage locations, or potential storage cells, can be allocated within the database and uniquely identified in relation to the ten elements for each dimension. To insert into, or withdraw from, the multidimensional array a particular value, therefore, the value's location is calculated from the value's element identifiers and the insertion or withdrawal step then effected. The advantage of this scheme is speed and simplicity.

The principal disadvantage of this scheme is that the number of potential values within a typical multidimensional array can be extremely large. The number of values actually stored, however, often is relatively small. Allocating storage locations for each of the potential values within a typical multidimensional array, therefore, can exceed the storage capacity of a personal computer or file server before any values are stored.

In order to overcome this problem, a storage and retrieval scheme has been implemented for values within a multidimensional array using a hierarchy of database-pointers. This scheme is illustrated in FIG. 2.

In accordance with this scheme, the number of dimensions comprising the array, and the number of elements comprising each dimension of the array, are determined before establishing the array. Many of the array's potential storage locations are not assigned within the computer's memory or database, however, until values actually are stored within the array.

To store a value, the elements corresponding to the value are determined. Assume, e.g., that the elements for a value $v_1$ are $a_1$, $b_2$, $c_3$ and $x_2$ for the first, second, third and last dimension, respectively. A storage node 1 corresponding to the array's first dimension, as shown in FIG. 2, then is established within the computer's database, and space within this storage node is allocated for all of the elements corresponding to this dimension ($a_1$, $a_2$, $a_3$, . . . , $a_n$). A database-pointer 3 then is stored in a storage location $a_1$ within this storage node corresponding to the element for the value's first dimension.

A second storage node 5 then is established within the computer's database corresponding to database-pointer 3 and to the array's second dimension. Space within this storage node is allocated for all of the elements corresponding to the second dimension ($b_1$, $b_2$, $b_3$, . . . , $b_n$). Database-pointer 3 is caused to point to storage node 5. A database-pointer 7 is stored within storage node 5 at a storage location $b_2$ corresponding to the element for the value's second dimension.

A third storage node 9 then is established within the computer's database corresponding to database-pointer 7 and also to the array's third dimension. Space within this third storage node is allocated for all of the elements within the array's third dimension ($c_1$, $c_2$, $c_3$, . . . , $c_n$). Database-pointer 7 is caused to point to storage node 9. A database-pointer 11 is stored within storage node 9 at a storage location $c_3$ corresponding to the element for the value's third dimension.

These steps are repeated for each of the array's dimensions until a storage node 13, corresponding to the array's last dimension, is established. The value $v_1$ is stored in a storage location $x_2$ corresponding to the element for the value's last dimension.

When a second value is stored within the multidimensional array, similar steps are effected. If the element corresponding to the second value's first dimension is the same as that for the first value, no new database pointer is stored in storage node 1. On the other hand, if the element corresponding to the second value's first dimension is different from that for the first value, e.g., is $a_3$, then a second database-pointer 15 is stored within storage node 1 at a storage location $a_3$ corresponding to this element.

A new storage node 17 then is established within the computer's database, in a manner similar to that described above, corresponding to database-pointer 15 and also to the array's second dimension. Space within storage node 17 is allocated for all of the elements of the second dimension ($b_1$, $b_2$, $b_3$, . . . , $b_n$). Database-pointer 15 is caused to point to storage node 17. A database-pointer 19 is stored within storage node 17 at a storage location $b_2$ corresponding to the element for the second value's second dimension. These steps are repeated, as for the first value, until the second value $v_2$ is stored in a storage node 21 at a storage location $x_3$, corresponding, respectively, to the array's last dimension and the second value's element for this dimension.

If the element corresponding to the first dimension are the same for the first value and the second value, a database-pointer 23 corresponding to the element for the second value's second dimension is stored in storage node 5. This storage node is the same storage node in which database-pointer 7 is stored which corresponds to the element for the first value's second dimension. Assuming the elements for the first and second values' second dimension are different, the hierarchical tree of database-pointers for these values splits at storage node 5, rather than storage node 1.

In accordance with this scheme, therefore, in order to insert into, or withdraw from, the multidimensional array a particular value, the element identifiers corresponding to the value are determined. For the insertion step, database-pointers, and finally the value, are placed within storage nodes corresponding to the array's various dimensions. The value is withdrawn from memory by tracing the hierarchy of database-pointers defined by the value's element identifiers.

Under this scheme, notwithstanding that the size of a multidimensional array is defined (viz., the number of dimensions and the number of elements within each dimension), the allocation of space within a computer's memory upon establishing the array, for all of the array's potential values and all of the array's corresponding potential storage locations, is avoided. The amount of memory allocated is proportional to the number of values actually stored. This scheme avoids allocating huge blocks of a computer's memory to unused storage cells.

For large, sparsely populated multidimensional arrays, however, this scheme nevertheless results in substantial inefficiencies. For example, as shown in FIG. 1, only one database-pointer 11 is stored in storage node 9 at storage location $c_3$. Nevertheless, space is allocated within the computer's memory for storage cells corresponding to all of the elements within the array's third dimension, viz., $c_1$, $c_2$, $c_3$, . . . , $c_n$. If a subsequently stored value is defined by elements $a_1$ and $b_2$ for the first and second dimensions, respectively, then a second database-pointer will be stored within storage node 9. For sparsely populated arrays, however, the probability is substantial that such a second value will not exist. This probability increases, moreover, for storage nodes corresponding to the array's higher dimensions. As a result, for such multidimensional arrays, large amounts of the computer's memory are wasted.

The values stored within a multidimensional array can include values which are dependent upon other values. For example, as discussed in my U.S. Pat. No. 5,319,777, a multidimensional array may include "consolidation values," i.e. values which are, dependent upon a group of values within the multidimensional array whose element identifiers differ only with respect to one dimension of the array.

For example, as discussed above, the a, b, c and d dimensions of the array illustrated in FIG. 1 represent, respectively, expense items, months, departments and years. If this array also were to include quarterly and yearly averages for each expense item for a particular department in a given year, such averages would represent consolidation values. Each such value is calculated from other values within the array whose elements differ only with respect to one dimension, viz., the monthly dimension.

Consolidation values may be stored within a multidimensional array in the same manner as any other values. The only requirement is the addition of elements to the dimensions of the array for which consolidation values are provided. These additional elements define storage locations within the array in which these consolidation values are stored. In the alternative, database-pointers to the formulas used to calculate these consolidation values may be stored in these locations.

Consolidation values are calculated from simple formulas, viz., weighted sums of other values in a dimension. Also, the identity of the formula applicable to a particular consolidation value, even for large multidimensional arrays, depends upon only one element of one dimension. For example, in the multidimensional array discussed above, element $b_{n+1}$ can specify the formula for calculating quarterly averages, and element $b_{n+2}$ can specify the formula for calculating yearly averages.

In order to determine the applicability of a particular consolidation formula, the elements corresponding to a requested value are examined for the elements of each dimension corresponding to consolidation values. If such an element is present, the program diverts to the applicable consolidation formula. The program associated with this formula, based upon the other elements corresponding to the requested value, then withdraws the necessary values from the multidimensional array, performs the consolidation, and displays the result to the user. This scheme, therefore, avoids storing the consolidation values, and database-pointers to formulas for calculating the consolidation values, within the multidimensional array.

This scheme, however, cannot be applied to general formulas whose applicability depend upon a plurality of elements distributed randomly throughout the array's various dimensions. The values calculated from such formulas, moreover, can be dependent upon any value stored randomly throughout the multidimensional array.

To provide such calculated values, database-pointers to the applicable formulas are stored within all of the applicable storage locations or storage cells corresponding to the calculated values. For large, sparsely populated multidimensional arrays, this scheme results in the allocation of large blocks of the computer's memory for storing database-pointers pointing to the same formulas.

SUMMARY OF THE INVENTION

The present invention provides a system and method for storing within, and retrieving from, a computer database values of a multidimensional array which minimizes the amount of storage space required within a computer's memory.

In accordance with the system and method of the invention, storage nodes are defined within the computer's database corresponding to dimensions of the array, and database-pointers are stored within these storage nodes. The locations of the database-pointers within the storage nodes, however, are not used to identify the elements to which the database-pointers correspond. Instead, an indicium is stored with each database-pointer, or in association with each database-pointer, to provide this correspondence.

In an alternative embodiment, a sub-storage area is associated with each storage node. A sub-storage location is allocated within each of these sub-storage areas for each of the elements of the dimension to which the storage node corresponds. An indicium is stored within each sub-storage location indicating whether a database-pointer exists in the storage node corresponding to the associated element.

Since the storage location of a database-pointer does not identify the element to which the database-pointer corresponds, assigning storage locations within a storage node for each of the elements of the dimension to which the storage node corresponds, upon establishing the storage node, is unnecessary. Storage locations are allocated within each storage node only for the database-pointers actually stored within the storage node. The additional space necessary for associated indicia, or for allocating sub-storage areas for the indicia, is relatively small compared to that necessary for all the potential storage locations within a storage node. The system and method of the present invention, therefore, provide substantial savings in space within a computer's memory, particularly for large, sparsely populated multidimensional arrays.

In one aspect, therefore, the present invention provides a system and method for storing within a database of a computer a series of database-pointers for a value of a multidimensional array. Each of the database-pointers corresponds to an element for the value with respect to a dimension of the array.

In accordance with this aspect of the invention, a storage node is established within the database which is associated with a dimension of the array. A database-pointer is stored within a storage location of the storage node, and this database-pointer is caused to point to another storage node within the database. An indicium identifying the value's element for the dimension also is stored within this storage location, or in association with this storage location. Space is allocated within the storage node only for the database pointers and indicia stored within the storage node.

In an alternative embodiment, a sub-storage area is established within the computer's database. This sub-storage area is associated with the storage node and has sub-storage locations for each of the elements of the dimension to which the storage node corresponds. An indicium is stored within each sub-storage area at each sub-storage location corresponding to an element for which a database-pointer is stored in the storage node.

Storage space is allocated within the sub-storage area for sub-storage locations corresponding to each of the elements of the dimension to which the storage node corresponds. Storage space is allocated within the storage node, however, only for the database-pointers actually stored within the storage node.

In an alternative embodiment, each of the storage nodes corresponding to a dimension of the array consists of a subsidiary hierarchial tree of storage nodes. Each of the storage nodes within each of the subsidiary hierarchical trees has M storage locations. The number M preferably is selected from numbers whose log to the base two is a whole number. In a preferred embodiment, M is set at 16.

In accordance with this aspect of the invention, a series of digits or symbols representing a value's element with respect to a dimension of the array is determined. This series of digits or symbols identifies the element in a number system having a base or radix M. Each of the digits or symbols corresponds to one of a consecutive, whole-number series of powers of M.

A storage node is associated with each of the powers of M, and each of these storage nodes has a maximum of M potential storage locations. A database-pointer is stored within each storage node. Each of these database-pointers corresponds to the digit or symbol associated with the power of M with which the storage node is associated. Each of these database-pointers is stored within the storage node at a location indicating the identity of its associated digit or symbol. Each of the database-pointers, associated with a digit or symbol corresponding to a power of M greater than zero, is caused to point to the storage node storing the database-pointer associated with the digit or symbol corresponding to the power of M which is next smaller in the series.

The establishment of a subsidiary hierarchical tree of similarly sized storage nodes, for each storage node corresponding to a dimension of the array, facilitates the use of relatively simple methods for identifying, inserting and withdrawing database-pointers and values from the hierarchical trees. Since each of the storage nodes of a subsidiary hierarchial tree is relatively small in comparison to the size of a storage node corresponding to a dimension of the array, the use of the storage location of a database-pointer within a storage node to identify the digit or symbol to which the database-pointer corresponds results in allocating a relatively small amount of unused storage space within the computer's memory.

In a preferred embodiment, however, each of the storage nodes comprising each of the subsidiary hierarchical trees is further compressed in a manner similar to that described above. Space is allocated within each storage node, therefore, only for the database-pointers actually stored within the storage node. Indicia are stored with each database-pointer, or in association with each database-pointer, to identify the power of M, and the digit or symbol, to which the database-pointer corresponds. In an alternative embodiment, a sub-storage area, also similar to that described above, is established for each storage node to identify these digits or symbols. A second sub-storage area also is associated with each storage node, and an indicium is stored within each of these second sub-storage areas, to identify the power of M with which the storage node is associated.

In accordance with a further aspect of the present invention, a table of calculation rules is established within the computer's database. This table is stored separately from the multidimensional array and has a hierarchial structure. This structure can comprise any hierarchial scheme which resolves a conflict among conflicting rules. In a preferred hierarchial scheme, each rule stored within the table takes precedence over all rules stored below it.

Each rule defines one or more storage locations within the multidimensional array and provides a formula for calculating the values applicable to those locations. This definition can include elements from any number of dimensions of the array and preferably omits elements irrelevant to the definition. The formulas can comprise any arithmetic or logical operations, including multiplication, division, subtraction, addition, rounding, etc., and provide the identity of the storage locations within the array from which the values for these operations are obtained.

To withdraw a requested value from the multidimensional array, the elements corresponding to the value initially are compared to the elements within the table which define the storage locations for which the rules are applicable. If more than one applicable rule is found, the rule dictated by the table's hierarchial scheme is executed. In a preferred embodiment, the first applicable rule is executed, notwithstanding that other rules also may be applicable. The value determined by this execution is returned and displayed to the user.

If no rule is found applicable, the elements corresponding to the request then are applied to the database storing uncalculated values for the array. If matching elements are found within this database, the value corresponding to these matching elements is returned and displayed to the user. If no matching elements are found, the value zero, or some other indication of the absence of a value, is returned and displayed to the user.

DETAILED DESCRIPTION OF THE PREFERRED EMBODIMENTS

Figures 1, 11:
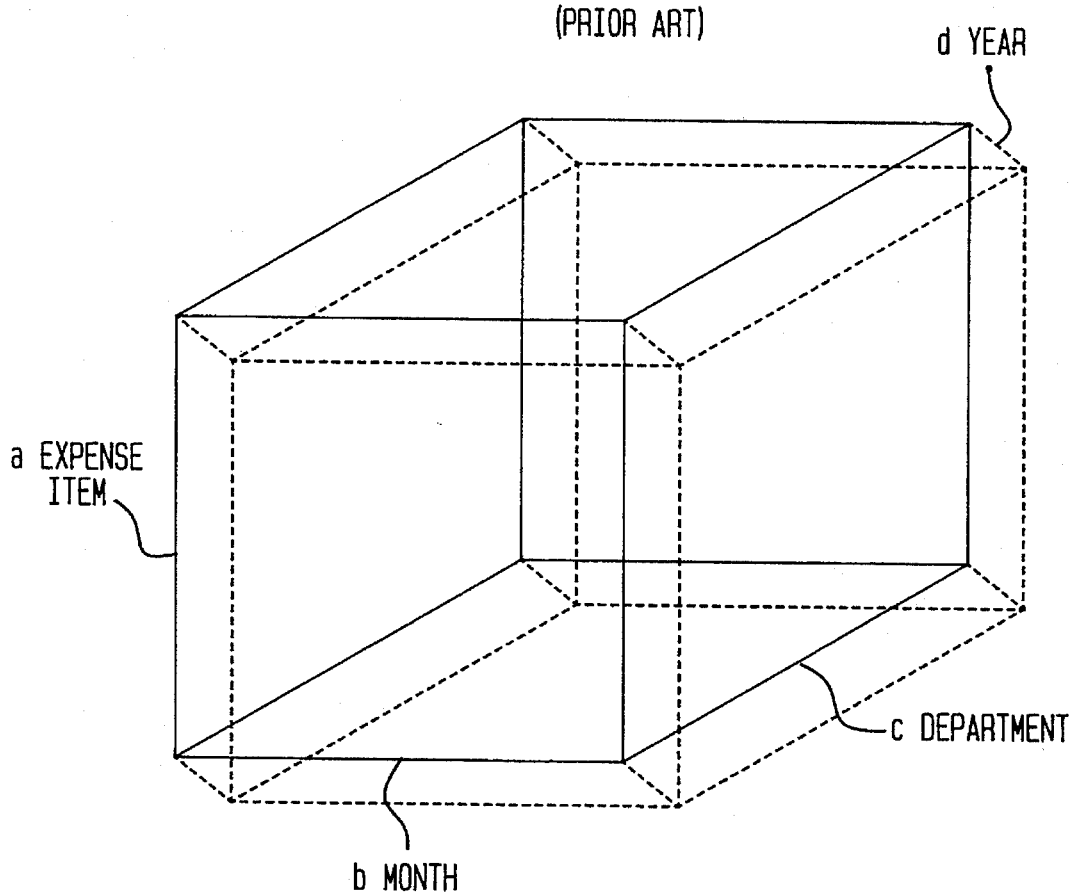
FIG. 1 is a perspective diagram illustrating a multidimensional array.
FIG. 11 is a schematic diagram of a rule table in accordance with the present invention.

The system and method of the present invention are intended for storing within, and retrieving from, a computer's memory or database the values of a multidimensional array. Such an array is illustrated in FIG. 1.

The system and method of the present invention are intended for implementation on a digital computer, such as a personal computer, file server, mini computer, mainframe computer, etc. The typical components of such a computer, including a central processing unit, memory, input/output devices, etc., are well known to those skilled in the art and require no further discussion. Such a computer also typically includes within its memory one or more programs for performing applications, such as a spreadsheet program, a word processing program, a database managing program, a graphics program, etc. Such a computer also typically includes an internal operating system, such as DOS, for controlling the various internal operations of the computer.

As used in this specification, to "allocate" a storage location, or storage space, within the memory or database of a computer means to assign storage cells, or storage locations, within the memory or database such that these storage cells or storage locations, regardless of whether data are inserted in them, no longer are available in the memory or database for the general storage of information or data. Also, as used in this specification, a "database-pointer" means data stored within a storage location of a computer's database or memory which provide the identity of another storage location, or storage cell, within the database or memory.

Figure 3:
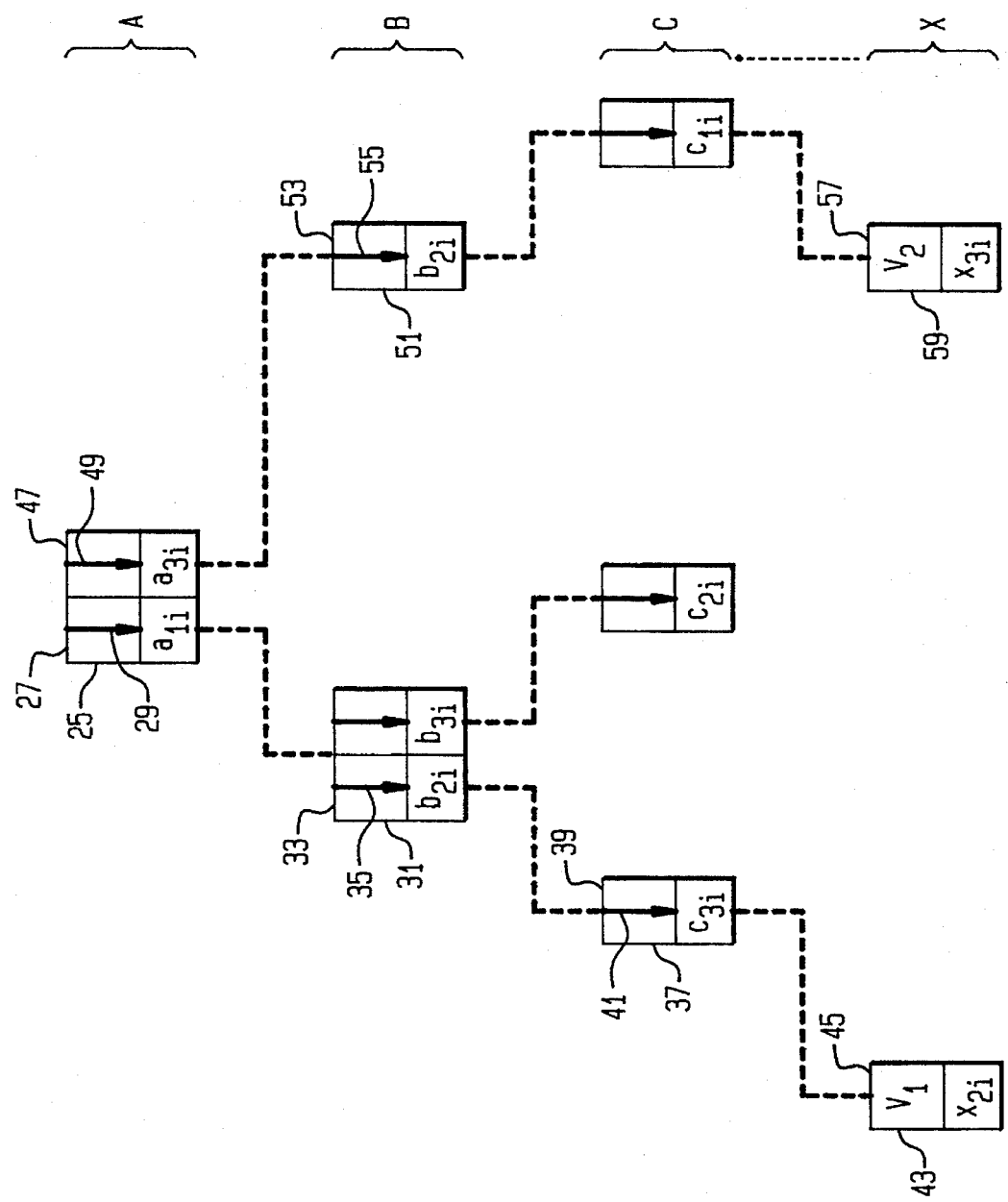
FIG. 3 is a schematic diagram of a method for storing database-pointers and values in accordance with the present invention.

A first embodiment of the present invention is illustrated in FIG. 3. Assume that the elements for a first value $v_1$ of a multidimensional array are $a_1$, $b_2$, $c_3$, and $x_2$ for the first, second, third, and last dimensions of the array, respectively. In accordance with the system and method of the invention, to store $v_1$ within the database of a computer, a storage node 25 corresponding to the array's first dimension is established within the database. A storage location 27 is allocated within this storage node for only one database-pointer 29. This database-pointer is stored within storage location 27 and corresponds to element $a_1$. An indicium $a_{1i}$ also is stored in storage location 27. As will be appreciated by one skilled in the art, storage location 27 may comprise a plurality of associated storage locations, or associated storage cells, within the computer's memory such that database-pointer 29 and indicium $a_{1i}$ are associated within the computer's memory. Indicium $a_{1i}$ identifies database-pointer 29 as corresponding to the first element of dimension a.

A second storage node 31 then is established within the computer's database. This storage node corresponds to database-pointer 29 and also to the array's second dimension, viz., dimension b. One storage location 33 is allocated within this second storage node for one database-pointer. Database-pointer 29 is caused to point to storage node 31. A database-pointer 35 is stored within storage location 33. Indicium $b_{2i}$ also is stored in storage location 33. Indicium $b_{2i}$ identifies database-pointer 35 as corresponding to the second element of dimension b.

A third storage node 37 then is established within the computer's database. This storage node corresponds to database-pointer 35 and also to the array's third dimension, viz., dimension c. One storage location 39 is allocated within this storage node for one database-pointer. Database-pointer 35 is caused to point to storage node 37. A database-pointer 41 is stored within storage location 39. Indicium $c_{3i}$ also is stored in storage location 39. Indicium $c_{3i}$ identifies database-pointer 41 as corresponding to the third element of dimension c.

These steps are repeated for each of the array's subsequent dimensions until a storage node 43, corresponding to the array's last dimension, is established. The value $v_1$ is stored in a storage location 45 within this storage node. Indicium $x_{2i}$ also is stored in storage location 45. Indicium $x_{2i}$ identifies value $v_1$ as corresponding to the second element of dimension x.

When a second value is stored within the multidimensional array, similar steps are effected. If the element for the second value's first dimension is the same as that for the first value, no new database-pointer is stored in storage node 25. On the other hand, if the element for the second value's first dimension is different from that for the first value, e.g., is $a_3$, then a second storage location 47 is established within storage node 25. A database-pointer 49 is stored within storage location 47. Indicium $a_{3i}$ also is stored within storage location 47. Indicium $a_{3i}$ identifies database-pointer 49 as corresponding to the third element of dimension a.

A new storage node 51 then is established within the computer's database corresponding to database-pointer 49 and also to dimension b. One storage location 53 is allocated within storage node 51 for one database-pointer. Database-pointer 49 is caused to point to storage node 51. A database-pointer 55 is stored within storage location 53. Indicium $b_{2i}$ also is stored within storage location 53. Indicium $b_{2i}$ identifies database-pointer 53 as corresponding to the second element of dimension b. Similar steps are repeated for the array's subsequent dimensions until the second value $v_2$ is stored in a storage location 57 of storage node 59 corresponding to the array's last dimension. Indicium $x_{3i}$ also is stored in storage location 57 to indicate that value $v_2$ corresponds to the third element of dimension x.

Figure 4:
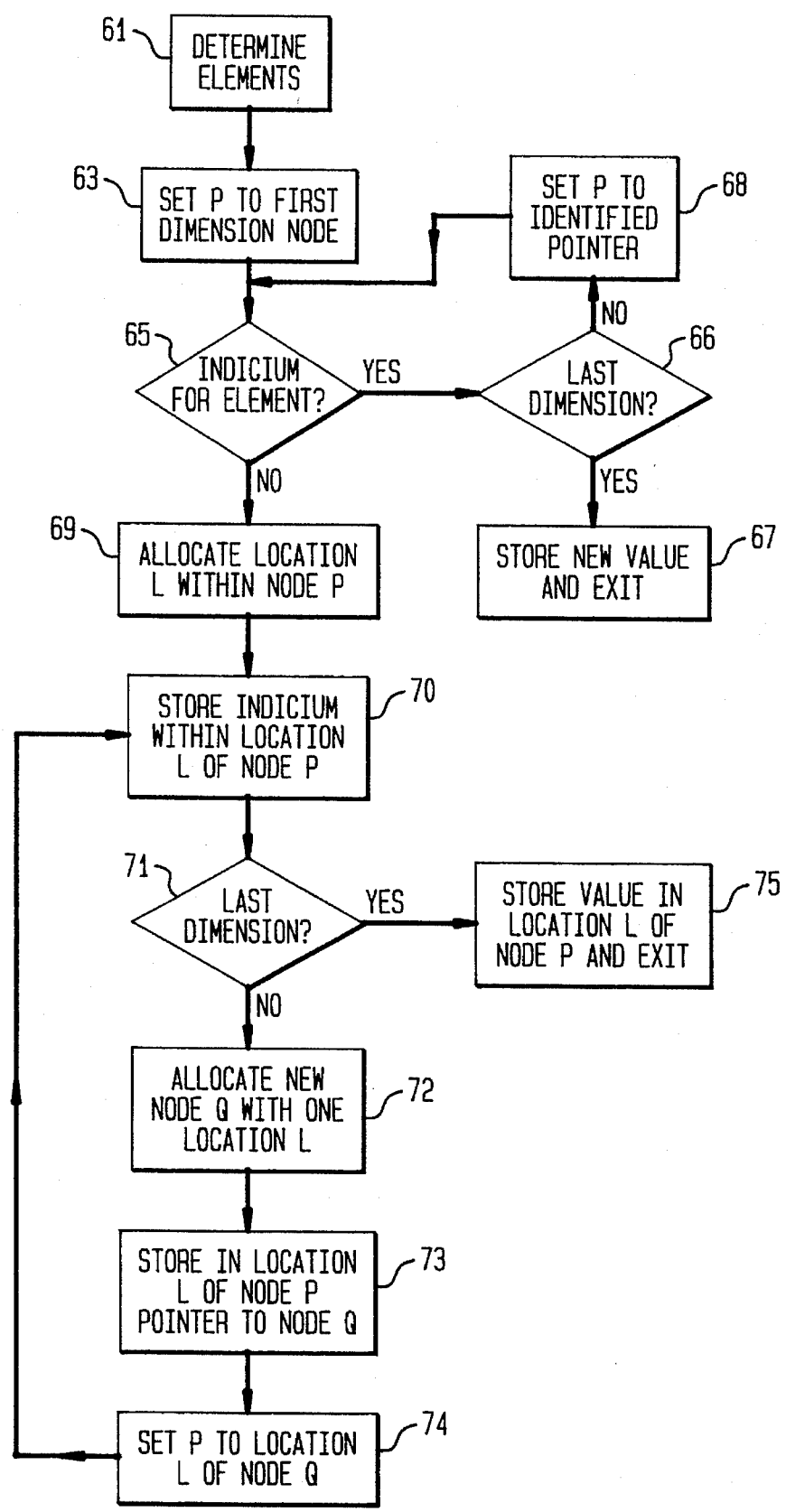
FIG. 4 is a flow diagram of the steps executed by a computer for storing database-pointers and values in accordance with the present invention.

FIG. 4 is a flow diagram of the steps executed by a computer for storing database-pointers for a value of a multidimensional array in accordance with the invention illustrated in FIG. 3. Input signals identifying a value for insertion into the array are received by the computer's central processing unit at block 61. These input signals typically are transmitted to the central processing unit from a keyboard or other computer input device, or from another computer program. The elements corresponding to the value are determined at block 61. This determination may be effected using, e.g., a lookup table to identify the elements corresponding to the input signals.

At block 63, a database-pointer P is caused to point to a storage node within the computer's database. The storage node to which database-pointer P points is referred to below as storage node P. At block 63, storage node P is the storage node corresponding to the first dimension of the multidimensional array. The indicia stored within this storage node, or in association with this storage node, are examined at decisional block 65. If an indicium corresponding to the value's element for the dimension to which storage node P corresponds is found, the program advances to block 66.

At block 66, the program determines whether storage node P corresponds to the array's last dimension. If storage node P corresponds to the last dimension, the program advances to block 67 where the value is stored in the storage location of storage node P identified by the found indicium.

On the other hand, if storage node P does not correspond to the array's last dimension, the program advances from decisional block 66 to block 68 where database-pointer P is set to the database-pointer identified by the found indicium. The program then returns to decisional block 65.

If at decisional block 65, no indicium is found corresponding to the value's element for the dimension to which storage node P corresponds, the program advances to block 69 where storage space is allocated within the computer's database for one new storage location L within storage node P. At block 70, an indicium is stored within storage location L of storage node P to identify the value's element for the dimension to which storage node P corresponds.

The program then determines, at decisional block 71, whether this element corresponds to the array's last dimension. If so, the program advances to block 75 where the value is stored in storage location L of storage node P. The program then is concluded.

On the other hand, if at decisional block 71, this element does not correspond to the array's last dimension, the program advances to block 72 where storage space is allocated within the computer's database for a new storage node Q with one storage location L. At block 73, a database-pointer is stored in storage location L of storage node P, and this database-pointer is caused to point to storage node Q. At block 74, database-pointer P is set to location L of storage node Q. The program then returns to block 70.

Figure 5:
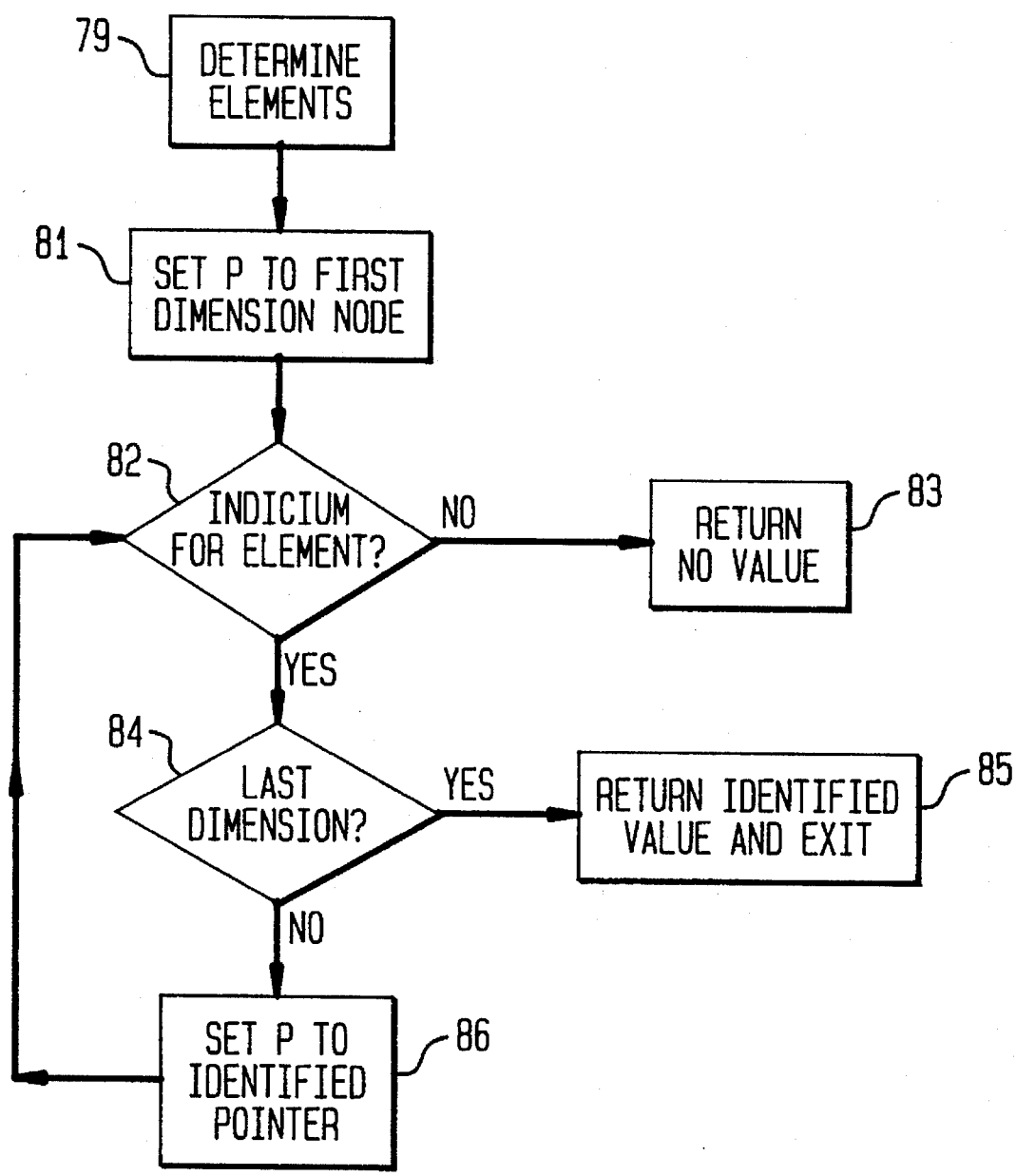
FIG. 5 is a flow diagram of the steps executed by a computer for retrieving database-pointers and values in accordance with the present invention.

FIG. 5 is a flow diagram of the steps executed by a computer to withdraw a value of a multidimensional array stored in accordance with the scheme illustrated in FIG. 3. The elements of the multidimensional array corresponding to the value are determined at block 79. This determination also may be effected using, e.g., a lookup table to identify the elements corresponding to input signals identifying the value.

At block 81, a database-pointer P is caused to point to the storage node within the computer's database corresponding to the array's first dimension. At block 82, the indicia stored within storage node P, or in association with this storage node, are examined. If no indicium corresponding to the value's element for the dimension to which storage node P corresponds is found, the value zero, or some other indication indicating the absence of a value, is returned and displayed to the user at block 83.

On the other hand, if at decisional block 82 an indicium corresponding to the value's element for the dimension to which storage node P corresponds is found, the program advances to decisional block 84 where the program determines whether this dimension corresponds to the array's last dimension. If so, the program advances to block 85 where the value stored within the storage location identified by the found indicium is returned and displayed to the user.

On the other hand, if at decisional block 84, the program determines that storage node P does not correspond to the array's last dimension, database-pointer P is set to the database-pointer identified by the found indicium. The program then returns to decisional block 82.

Figure 6:
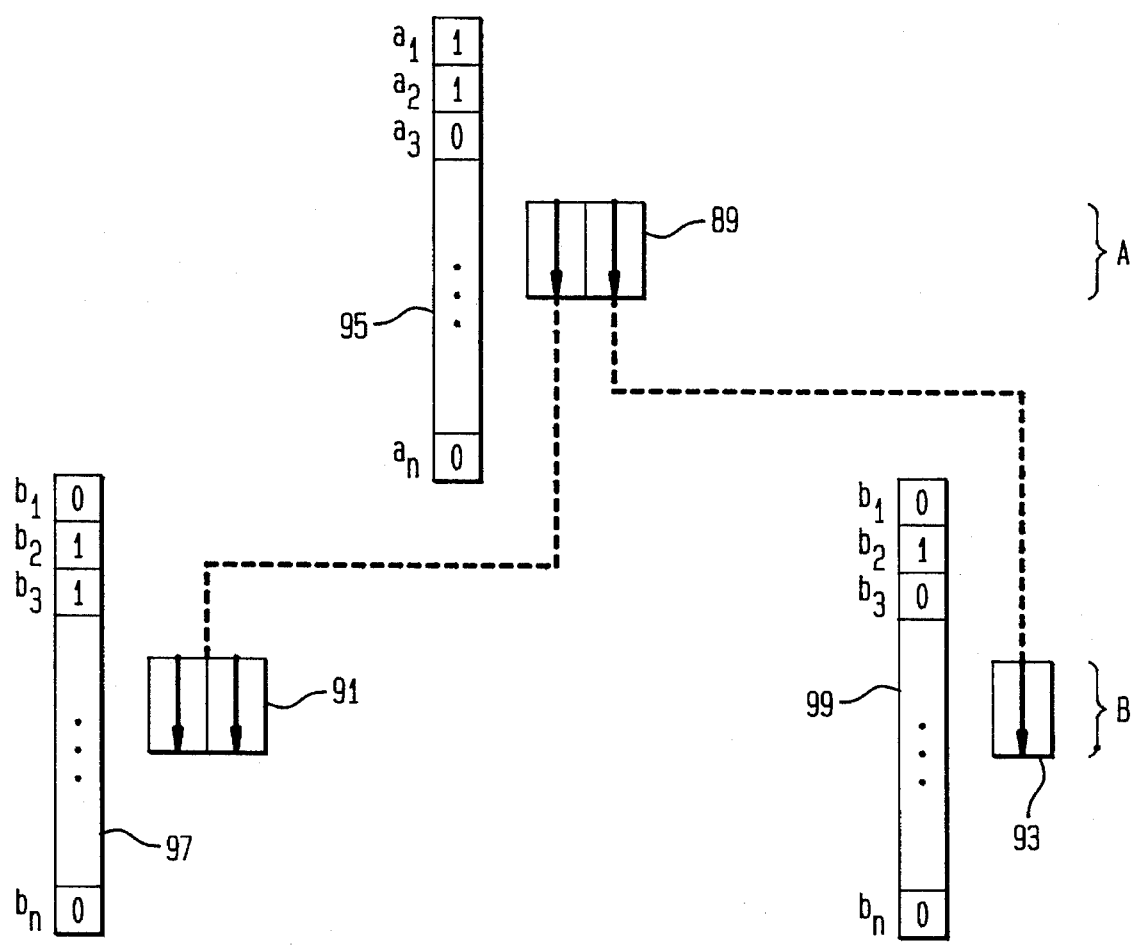
FIG. 6 is a schematic diagram of an alternative method for storing database-pointers and values in accordance with the present invention.

An alternative embodiment in accordance with the present invention is shown in FIG. 6. Storage nodes 89, 91, and 93 correspond, respectively, to storage nodes 25, 31, and 51 of FIG. 3. A sub-storage area, however, is created and associated with each of storage nodes 89, 91 and 93. Sub-storage areas 95, 97, and 99 are associated with, respectively, storage nodes 89, 91, and 93.

Sub-storage areas 95, 97 and 99 each have one sub-storage location for each of the elements of the dimension to which the sub-storage area's associated storage node corresponds. Each of these sub-storage locations has space for one bit. Since storage node 89 corresponds to the array's first dimension, sub-storage locations are allocated within its associated sub-storage area 95 for all of the elements corresponding to the first dimension, viz., $a_1, a_2, a_3, \ldots, a_n$. Since storage nodes 91 and 93 each correspond to the array's second dimension, sub-storage locations are allocated within these sub-storage areas for all of the elements corresponding to the array's second dimension, viz., $b_1, b_2, b_3, \ldots, b_n$.

If a database-pointer corresponding to the element associated with a sub-storage location exists in a storage node, the bit in this sub-storage location is set to one. If no such database-pointer exists in the storage node, the bit in this sub-storage location is set to zero.

For example, in sub-storage area 97, the bits in the sub-storage locations for elements $b_2$ and $b_3$ are set to one. These bits identify the database-pointers stored in the associated storage node 91 as corresponding to elements $b_2$ and $b_3$. The bits within all of the other sub-storage locations of sub-storage area 97, viz., $a_1$ and $b_3$ through $b_n$, are set to zero. These other bits indicate that no database-pointers exist in storage node 91 corresponding to all of these other elements.

The bits within the sub-storage locations of sub-storage areas 95 and 99 are set in a similar manner. The bits within sub-storage locations $a_1$ and $a_2$ of sub-storage area 95, therefore, and the bit within the sub-storage location $b_2$ of sub-storage area 99, are set to one. These bits identify the database-pointers in storage node 89, and the database-pointer in storage node 93 as corresponding to elements $a_1$ and $a_2$, and element $b_2$, respectively. The bits within all of the other sub-storage locations within sub-storage areas 95 and 99 are set to zero. These other bits indicate that no database-pointers are stored in these storage nodes corresponding to all of the other elements of the dimensions to which the storage nodes correspond.

The database-pointers stored within storage nodes 89, 91 and 93 are arranged in an order which corresponds to the sequence of positive bits in their associated sub-storage areas. For example, for the storage node associated with dimension a, the database-pointer existing in the storage node corresponding to the highest element identifier (e.g., $a_n$) is on the top of a stack of database-pointers, and the database-pointer existing in the storage node corresponding to the lowest element identifier (e.g., $a_l$) is on the bottom of this stack. In order to identify a particular database-pointer corresponding to a particular positive bit in a sub-storage area, therefore, the number of positive bits beginning at one end of the sub-storage area (e.g., $a_1$ or $a_n$) to the bit is determined. A similar count then is made of database-pointers within the associated storage node, beginning at a corresponding end of the stack of database-pointers, to identify the corresponding database-pointer.

The steps for inserting new database-pointers and values in accordance with the storage scheme illustrated in FIG. 6 are similar to those described in connection with FIG. 4. Rather than examine indicium at decisional block 65, however, the corresponding bit within the sub-storage location of the associated sub-storage area is examined. Also, when space is allocated for a new storage node at block 72, space also must be allocated for a sub-storage area corresponding to the storage node and having sub-storage locations, for one bit, for each of the elements of the dimension to which the storage node corresponds. A new database-pointer, moreover, must be inserted within a previously occupied storage node at a position corresponding to the database-pointer's position within the stack of database-pointers, as dictated by the number of positive bits in the storage node's associated sub-storage area. Also, at block 70, rather than store an indicium identifying the element to which the database-pointer corresponds, the corresponding bit within the associated sub-storage area is set to 1.

In order to retrieve a particular database-pointer in accordance with the storage scheme illustrated in FIG. 6, the computer executes steps similar to those described in FIG. 5. At decisional block 82, however, rather than examine stored indicia associated with the database-pointers, the computer examines a sub-storage location within the sub-storage area associated with the storage node. If a one is found in the sub-storage location corresponding to the value's element for the particular dimension, the program proceeds to block 84. On the other hand, if a zero is found in this sub-storage location, the program proceeds to block 83.

Figure 2:
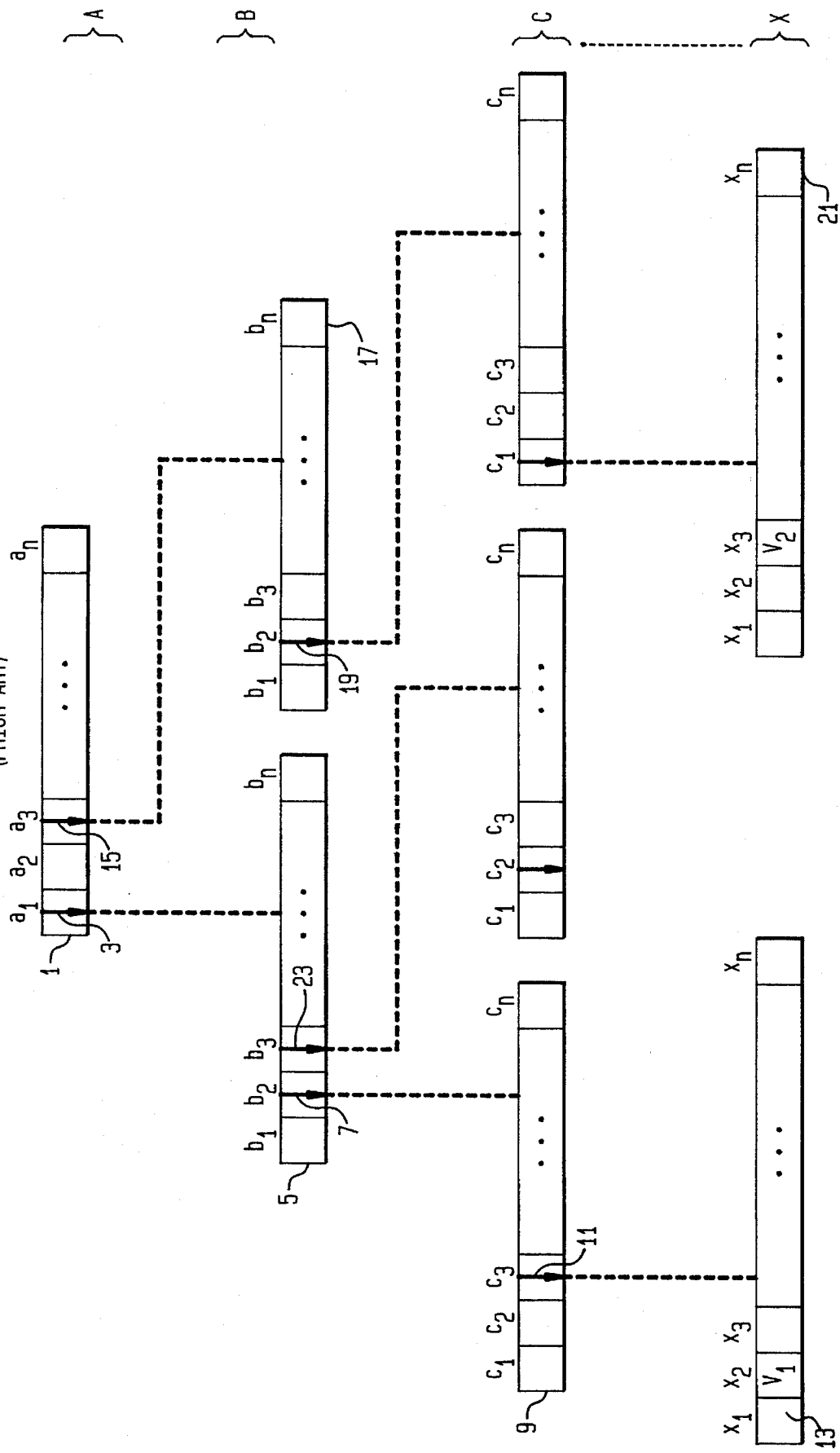
FIG. 2 is a schematic diagram of a prior-art method for storing database-pointers and values for a multidimensional array.

The embodiment of the invention illustrated in FIG. 6 results in substantial savings in space within a computer's memory, notwithstanding that upon allocating each new storage node, a concomitant sub-storage area also must be allocated with sub-storage locations for all of the elements corresponding to the dimension with which the storage node is associated. Each of these sub-storage locations, however, contains space for only one bit. In the prior-art scheme of FIG. 2, on the other hand, upon establishing a new storage node, storage locations must be allocated for a database-pointer corresponding to each element of the dimension to which the storage node corresponds. Since a storage location for a database-pointer requires at least four bytes of memory, as opposed to only one bit for a sub-storage location in a sub-storage area, substantial savings are achieved in the amount of memory allocated to unused, potential storage locations.

Figure 7:
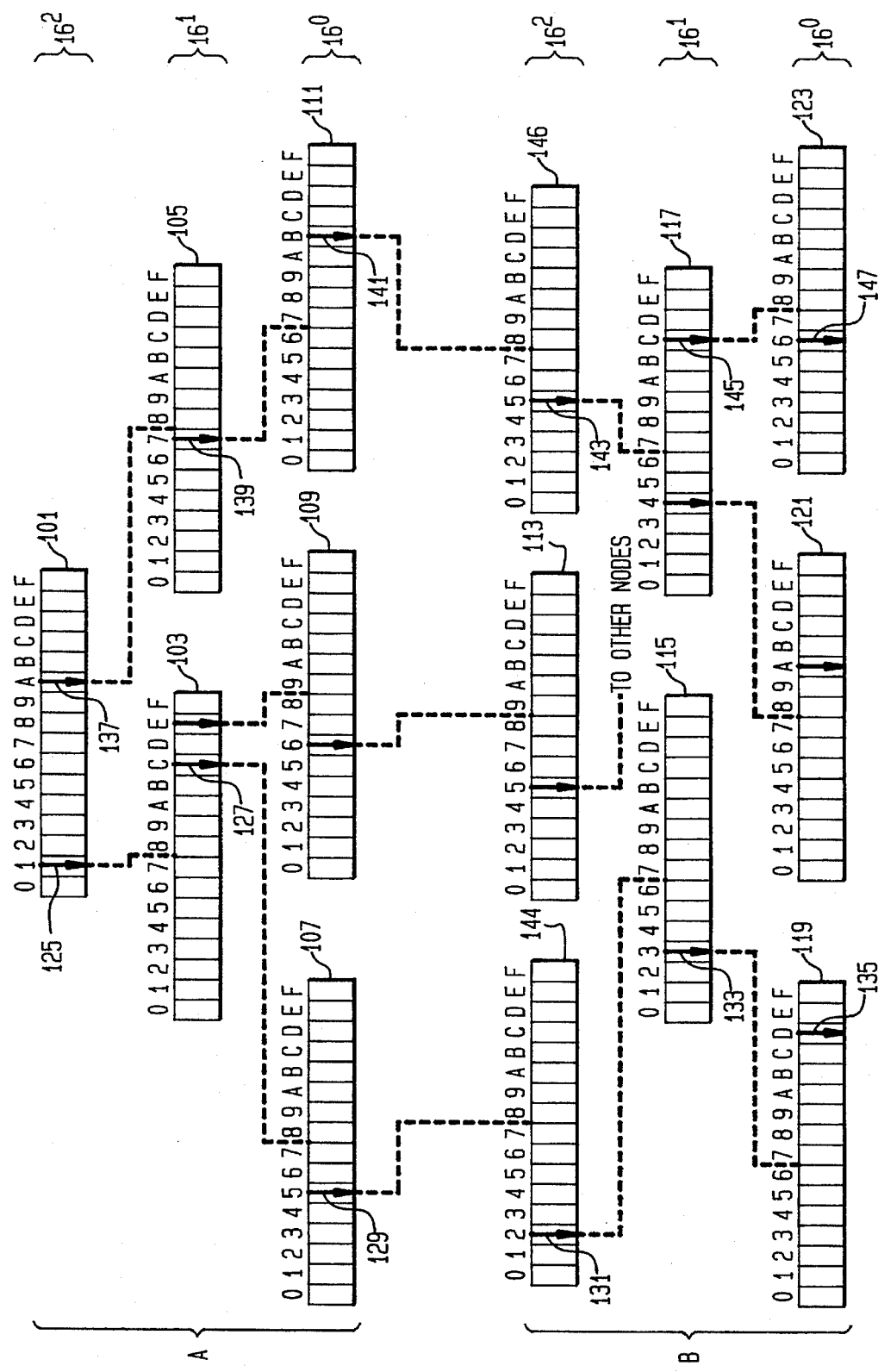
FIG. 7 is a schematic diagram of a method for storing database-pointers and values for a multidimensional array using subsidiary hierarchical trees in accordance with the present invention.

A further embodiment of the present invention is illustrated in FIG. 7. In accordance with this embodiment, a subsidiary hierarchical tree of storage nodes replaces each of the storage nodes of the principal hierarchial tree of storage nodes of FIG. 2. Each of these subsidiary hierarchical trees, therefore, corresponds to a dimension of the array. The size of each storage node within each subsidiary hierarchical tree is the same. This scheme results in substantial savings in the amount of memory assigned to unused, potential storage locations while also facilitating the use of relatively straight-forward methods for identifying, inserting and withdrawing database-pointers and values from the principal and subsidiary hierarchical trees.

The number of storage locations within each storage node of each subsidiary hierarchical tree can be any number. This number, however, preferably is selected from numbers whose log to the base two is a whole number. In view of the structural architecture of most of today's personal computers, moreover, this number preferably is 16.

Referring to FIG. 7, storage nodes 101, 103, 105, 107, 109 and 111 comprise one subsidiary hierarchical tree. These storage nodes replace the single storage node 1 for the first dimension, i.e., dimension a, of the multidimensional array in the prior-art scheme of FIG. 2. Storage nodes 101, 103, 105, 107, 109 and 111, therefore, all correspond to dimension a. Storage nodes 144, 113, 146 each begin a separate, subsidiary hierarchical tree corresponding to the second dimension, i.e., dimension b, of the multidimensional array. Each of these subsidiary hierarchial trees replaces one of the storage nodes for dimension b in the prior-art scheme of FIG. 2, e.g., storage nodes 5 and 17. Storage nodes 117, 121 and 123 are within the subsidiary hierarchical tree begun by storage node 146, and storage nodes 115 and 119 are within the subsidiary hierarchical tree begun by storage node 144. Additional storage nodes, not shown, also exist within the subsidiary hierarchical tree begun by storage node 113.

Each of the storage nodes within each of the subsidiary hierarchical trees has 16 storage locations. These storage locations correspond to the digits or symbols O through F of the hexadecimal number system.

In accordance with this embodiment of the invention, to store a value within the multidimensional array, the elements corresponding to the value first are determined. Assume, e.g., that, for a value $v_1$, these elements are the decimal numbers 453 and 573 for dimensions a and b, respectively. These decimal numbers are converted to hexadecimal numbers (a number system having a radix or base of 16, rather than 10) using methods well known in the art. The hexadecimal equivalent of 453 is 1C5, and the hexadecimal equivalent of 573 is 23D. The hexadecimal number 1C5 represents $(1\times16^2)+(12\times16^1)+(5\times16^0)$, which equals the decimal number 453. The hexadecimal number 23D represents $(2\times16^2)+(3\times16^1)+(13\times16^0)$, which equals the decimal number 573.

A storage node 101 then is established within the computer's database. This storage node corresponds to the array's first dimension and to the most significant hexadecimal digit or symbol for the hexadecimal representation of the element for the value's first dimension. In this example, this digit or symbol corresponds to $16^2$. Space within this storage node is allocated for all of the hexadecimal digits or symbols, viz., 1, 2, 3, 4, 5, 6, 7, 8, 9, A, B, C, D, E and F. A database-pointer 125 then is stored in the storage location within this storage node corresponding to this most significant digit or symbol. In this example, this storage location is the storage location corresponding to the digit 1.

A storage node 103 then is established within the computer's database. This storage node corresponds database-pointer 125 and the next most significant hexadecimal digit or symbol for the hexadecimal representation of the element for the value's first dimension. This digit or symbol corresponds to $16^1$. Space within this storage node also is allocated for all of the digits or symbols corresponding to the hexadecimal number system. Database-pointer 125 is caused to point to storage node 103. A database-pointer 127 is stored within storage node 103 at a storage location C corresponding to this second digit or symbol.

A third storage node 107 then is established with the computer's database. This storage node corresponds to database-pointer 127 and the next most significant hexadecimal digit or symbol for the hexadecimal representation of the element for the value's first dimension. This digit or symbol corresponds to $16^0$. Space within this storage node is allocated for all of the digits or symbols corresponding to the hexadecimal number system. Database-pointer 127 is caused to point to storage node 107. A database-pointer 129 is stored within storage node 107 at a storage location 5 corresponding to this third hexadecimal digit or symbol. This database-pointer is caused to point to storage node 144 which corresponds to the most significant hexadecimal digit or symbol for the hexadecimal representation of the element for the value's second dimension. Storage node 144 begins a new subsidiary hierarchical tree.

Similar steps are effected for inserting database-pointers within the storage nodes of the subsidiary hierarchical tree begun by storage node 144. Since the hexadecimal representation of the element for the value's second dimension is 23D, database-pointer 131 is placed in storage location 2 of storage node 144 (corresponding to $16^2$), database-pointer 133 is placed in storage location 3 of storage node 115 (corresponding to $16^1$) and database-pointer 135 is placed in storage location D of storage node 119 (corresponding to $16^0$).

Similar subsidiary hierarchical trees are created for each of the array's subsequent dimensions until $v_1$ is stored in a storage location of a storage node associated with the least significant digit or symbol for the hexadecimal representation of the element for the value's last dimension.

When a second value $v_2$ is stored within the multidimensional array, similar steps are effected. If the decimal number for the element for the second value's first dimension is less than or equal to 4,095 ($16^3-1$), then a second database-pointer corresponding to the most significant digit or symbol for the hexadecimal representation for this number is inserted in the appropriate location within storage node 101. For example, for a second value whose elements for dimensions a and b are, respectively, 2,683 decimal and 1,478 decimal, the hexadecimal representations for these elements for dimensions a and b are, respectively, A7B and 5C6. For the value's element for dimension a, database-pointers 137, 139 and 141 are inserted in storage locations A, 7 and B, respectively, of storage nodes 101, 105 and 111, respectively. In a similar manner, database-pointers 143, 145 and 147 are inserted in, respectively, storage locations 5, C and 6 of storage nodes 146, 117 and 123, respectively. Storage nodes 146, 117 and 123 comprise a second, subsidiary hierarchical tree corresponding to dimension b.

On the other hand, if the second value's element for dimension a exceeds 4,095 decimal, a storage node corresponding to $16^3$ must be allocated for the subsidiary hierarchical tree corresponding to this dimension. For example, if the element corresponding to dimension a for the second value is 5,003 decimal (1007 hexadecimal), a storage node within the subsidiary hierarchical tree for dimension a corresponding to $16^3$ must be allocated. Database-pointers would be inserted, in this case, in storage locations 0 and 1 of this new storage node. The database-pointer in storage location 0 would point to storage node 101, and the database-pointer in storage node 1 would begin the portion of the subsidiary hierarchical tree corresponding to the second value's element for dimension a.

Since each of the storage nodes within the subsidiary hierarchical trees is relatively small in comparison to the size of a storage node corresponding to an entire dimension of a multidimensional array, the use of a database-pointer's location within a storage node to identify the hexadecimal digit or symbol to which the database-pointer corresponds results in allocating a relatively small amount of unused storage space within the computer's memory. In a further embodiment, however, each of the storage nodes comprising the subsidiary hierarchical trees is further compressed in accordance with the methods discussed above for storage nodes corresponding to an entire dimension of the array. Space is allocated, therefore, within each storage node of the subsidiary hierarchical trees only for the database-pointers actually stored within the storage node. Indicium are stored in association with each database-pointer, or sub-storage areas are associated with each storage node, to identify the hexadecimal digits or symbols to which the database-pointers correspond.

Figure 8:
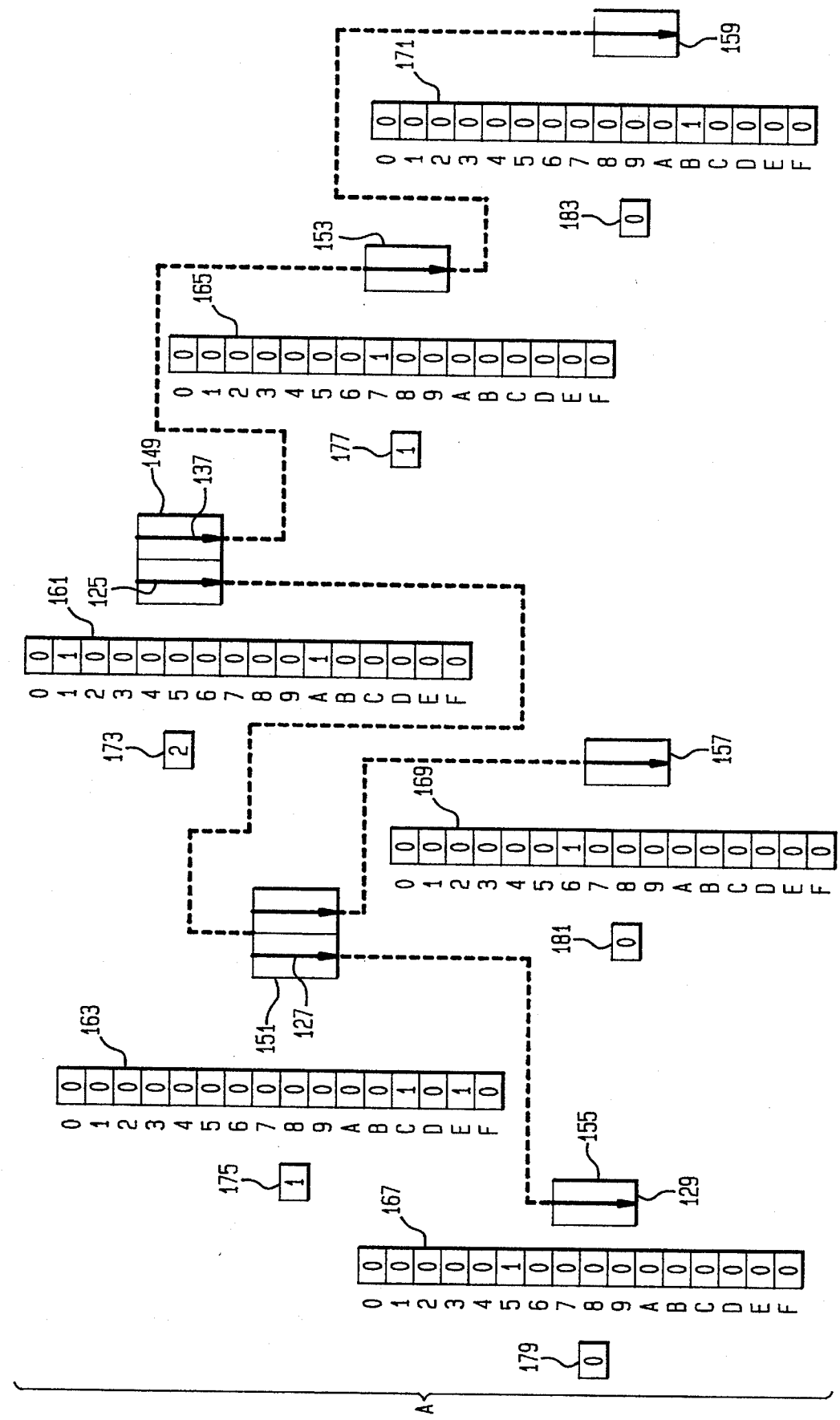
FIG. 8 is a schematic diagram of a method for compressing the storage nodes of the subsidiary hierarchical trees shown in FIG. 7.

Such an embodiment is illustrated in FIG. 8. The storage nodes shown in this figure correspond to the storage nodes of the subsidiary hierarchical tree for dimension a of FIG. 7. Storage nodes 149, 151, 153, 155, 157 and 159 correspond, respectively, to storage nodes 101, 103, 105, 107, 109 and 111 of FIG. 7. Space within each of the storage nodes of FIG. 8, however, is allocated only for the database-pointers actually stored within the storage nodes. No space is allocated for potential, unused storage locations.

Sub-storage areas are associated with each of the storage nodes shown in FIG. 8. Sub-storage areas 161, 163, 165, 167, 169 and 171 are associated with, respectively, storage nodes 149, 151, 153, 155, 157 and 159. Space within each of these sub-storage areas is allocated for each of the digits or symbols corresponding to the hexadecimal number system. This allocation occurs upon establishing each storage node and its associated sub-storage area. Each of the sub-storage areas functions as a bit map for its associated storage node in a manner similar to that of sub-storage areas 95, 97 and 99 of FIG. 6. A one is inserted in each sub-storage location of each sub-storage area for the hexadecimal digits or symbols corresponding to the database-pointers existing in the associated storage node.

For example, ones are inserted in sub-storage locations 1 and A of sub-storage area 161. These bits indicate that database-pointer 125 corresponds to hexadecimal digit 1 and database-pointer 137 corresponds to hexadecimal symbol A. In a similar manner, a one is inserted in storage locations C and 5 of sub-storage areas 163 and 167 to indicate that database-pointers 127 and 129 within storage nodes 151 and 155, respectively, correspond to hexadecimal digits C and 5, respectively. A correspondence is established between positive bits in a sub-storage area and database-pointers within an associated storage node by arranging the database-pointers in association with the positive bits in the manner discussed above in connection with FIG. 6.

In order to further facilitate the insertion and withdrawal of database-pointers, a level storage area also is associated with each storage node. Level storage areas 173, 175, 177, 179, 181 and 183 are associated with, respectively, storage 149, 151, 153, 155, 157 and 159. A number is inserted within each of these level storage areas identifying the power of 16 to which the level storage area's associated storage node corresponds. Therefore, since storage node 149 corresponds to the hexadecimal digits or symbols associated with $16^2$, storage nodes 151 and 153 correspond to the hexadecimal digits or symbols associated with $16^1$, and storage nodes 155, 157 and 159 correspond to the hexadecimal digits or symbols associated with $16^0$, the number 2 is inserted in level storage area 173, the number 1 is inserted in level storage areas 175 and 177, and the number 0 is inserted in level storage areas 179, 181 and 183.

Figure 9:
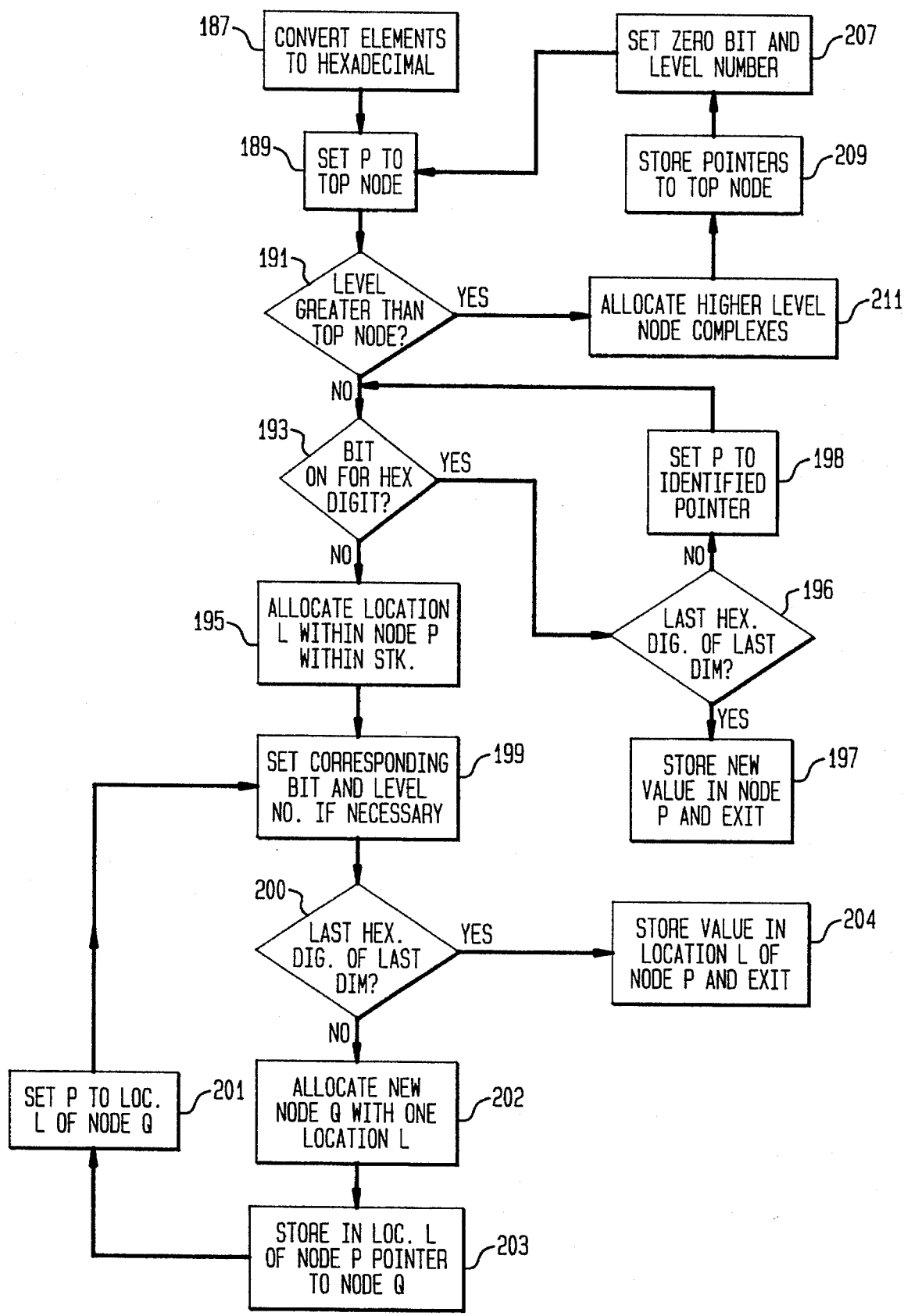
FIG. 9 is a flow diagram of the steps executed by a computer for storing database-pointers and values in the subsidiary hierarchical trees.

FIG. 9 is a flow diagram of the steps executed by a computer for storing database-pointers for a value of a multidimensional array in accordance with the invention illustrated in FIGS. 7 and 8. At block 187, the elements for each of the value's dimensions are converted to hexadecimal numbers. At block 189, a database-pointer P is caused to point to the top storage node (storage node P) of the subsidiary hierarchical tree corresponding to the array's first dimension, viz., dimension a. This storage node corresponds to the hexadecimal digits or symbols associated with the highest power of 16 for this dimension.

The level storage area associated with this top storage node is examined, at decisional block 191, to determine whether the number stored in this level storage area is greater than the power of 16 for the most significant bit or symbol for the hexadecimal representation of the element corresponding to the array's first dimension. If this power of 16 is greater than this number, then the program proceeds to block 211.

At block 211, space within the computer's memory is allocated for one or more new node complexes. These new node complexes correspond to one or more powers of 16 which are higher than that to which the original top storage node corresponds. Each of these new node complexes comprises a level storage area, a sub-storage area and a storage node with one storage location. At block 209, a database-pointer is inserted in each of these storage locations, and each of these database-pointers is caused to point to the storage node which corresponds to the next lower power of 16. Each of these database-pointers corresponds to the zero hexadecimal digit. At block 207, the bits in the zero sub-storage locations of the new storage nodes' associated sub-storage areas are set to 1, and the appropriate level numbers are inserted in the associated level storage areas. The program then returns to block 189 where database-pointer P is reset to point to the new top storage node.

On the other hand, if at decisional block 191, the power of 16 associated with the most significant digit or symbol for the hexadecimal representation of the element corresponding to the array's first dimension is less than or equal to the number in the level storage area for the top storage node, then the program proceeds to decisional block 193 where the top storage node's associated sub-storage area is examined for a positive bit in the sub-storage location corresponding to this most significant digit or symbol. If the bit in this sub-storage location is set to 1, the program proceeds to decisional block 196 where the program determines whether this digit or symbol corresponds to the least significant digit or symbol for the hexadecimal representation of the element corresponding to the array's last dimension. If so, the program advances to block 197 where the value is stored in the storage location identified by this bit. This identification includes counting, from one end of the sub-storage area, the number of positive bits to the identified positive bit and making a similar count of database-pointers from a corresponding end of the storage node. The program then is concluded.

On the other hand, if at decisional block 196, the program determines that the digit or symbol does not correspond to the least significant digit or symbol for the value's element for the array's last dimension, the program proceeds to block 198 where database-pointer P is set to the database-pointer in the storage node identified by this bit. This identification is effected in a manner similar to that at block 197. The program then returns to decisional block 193.

One the other hand, if at decisional block 193, the bit in the sub-storage location of the sub-storage area associated with the most significant digit or symbol for the hexadecimal representation of the element corresponding to the array's first dimension is not set to 1, the program proceeds to block 195 where space for a new storage location L is allocated within storage node P. At block 199, the appropriate bit is set to one in the appropriate sub-storage location of the sub-storage area associated with storage node P. If this storage node is a new storage node, moreover, the appropriate level number is inserted, at block 199, in the level storage area associated with this storage node. The program then advances to decisional block 200.

At decisional block 200, the program determines whether storage node P corresponds to the least significant digit or symbol for the value's element corresponding to the array's last dimension. If so, the program advances to block 204 where the value is stored in location L of storage node P. The program then is concluded.

On the other hand, if at decisional block 200, the program determines that storage node P does not correspond to the least significant digit or symbol for the value's element for the array's last dimension, the program advances to block 202 where storage space is allocated within the computer's memory for a new node complex Q with one storage location L within its storage node. At block 203, a database-pointer is stored in location L of storage node P. This database-pointer, at block 201, is set to point to location L of storage node Q. The program then returns to block 199.

Figure 10:
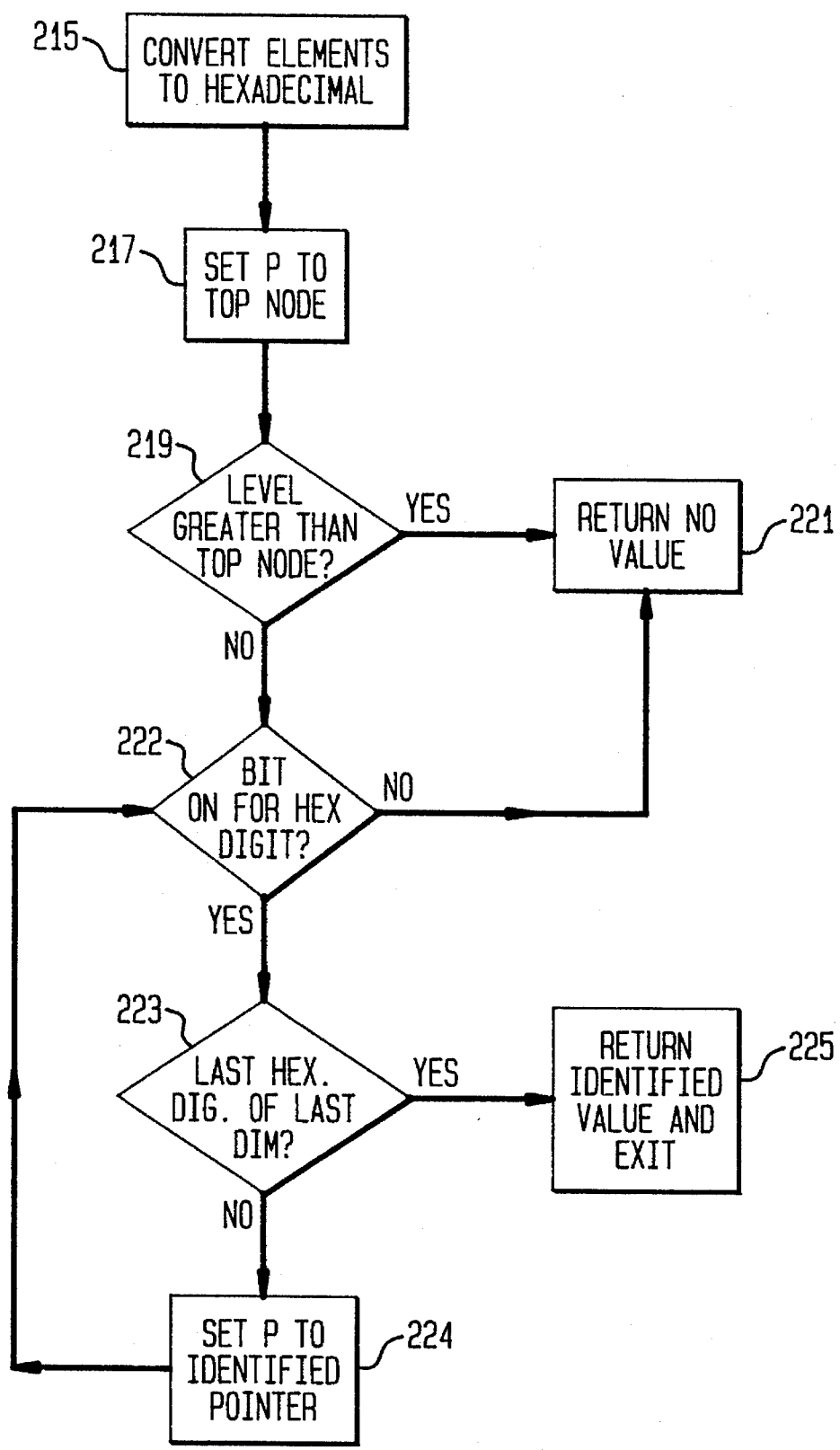
FIG. 10 is a flow diagram of the steps executed by a computer for retrieving database-pointers and values from the subsidiary hierarchical trees.

FIG. 10 is a flow diagram of the steps executed by a computer to withdraw a value of a multidimensional array stored in accordance with the scheme illustrated in FIGS. 7 and 8. The elements for the value are converted to hexadecimal numbers at block 215. At block 217, a database-pointer P is set to the top storage node (storage node P) of the subsidiary hierarchical tree corresponding to the array's first dimension. At decisional block 219, the level number stored in the level storage area for storage node P is compared to the power of 16 corresponding to the most significant digit or symbol for the hexadecimal number corresponding to the value's element for the first dimension. If this power of 16 is greater than this number, then no value corresponding to this element is stored in the multidimensional array. The program, therefore, proceeds to block 221 where the value 0, or some other indication of the absence of a value, is returned and displayed to the user.

On the other hand, if this power is equal to or less than this number, then the program proceeds to decisional block 222 where the sub-storage location of the sub-storage area corresponding to storage node P is examined for a positive bit corresponding to the most significant digit or symbol for this hexadecimal number. If no positive bit is found in this sub-storage location, no value corresponding to the element is stored in the multidimensional array. The program, therefore, again proceeds to block 221 where the value 0, or some other indication of the absence of a value, is returned and displayed to the user.

On the other hand, if the bit in this storage location is set to 1, the program proceeds to block 223 where the program determines whether the hexadecimal digit or symbol corresponds to the least significant digit or symbol for the element corresponding to the last dimension of the array. If so, the program advances to block 225 where the value in the associated storage node corresponding to this digit or symbol is returned and displayed to the user.

On the other hand, if this hexadecimal digit or symbol does not correspond to the least significant digit or symbol for the element corresponding to the array's last dimension, the program advances to block 224 where database-pointer P is set to the database-pointer corresponding to the digit or symbol in the associated storage node. The program then returns to decisional block 222 where similar steps are effected at the new storage node identified by database-pointer P. The program repeats these steps until either a positive value, or the value 0 or some other indication of the absence of a value, is returned and displayed to the user.

In a further aspect of the invention, space within a computer's memory is further conserved through the use of a separate hierarchial table of calculation rules. These rules contain elements defining one or more storage locations within the multidimensional array (referred to below as an "area" of the array) and provide a formula for calculating the values applicable to those locations. The elements corresponding to a requested value from the array initially are compared to the elements within the hierarchial table of calculation rules. If a particular rule is found applicable, the rule is executed and the calculated value is returned and displayed to the user. The allocation of storage space within the computer's memory for storing either these calculated values, or database-pointers to formulas for determining these calculated values, therefore, is unnecessary.

The formulas can comprise any arithmetic or logical operations, including multiplication, division, subtraction, addition, rounding, etc., and provide the identity of the storage locations within the array from which the data for these operations are obtained. The areas to which rules apply are defined using elements from any number of dimensions of the array. Elements irrelevant to the definition are omitted. If a particular rule applies to certain elements of certain dimensions, regardless of the identity of elements from other dimensions, therefore, no reference exists in the definition to elements from these other dimensions.

The area to which a rule applies can overlap the areas to which other rules apply. The table, therefore, employs a hierarchial structure to resolve conflicts among conflicting rules. Any hierarchial structure can be employed to resolve such conflicts. For example, the first applicable rule stored in the table can be executed, notwithstanding that other rules stored below this rule also may be applicable. In the alternative, weights can be assigned to each rule, or to each element defining the areas to which each rule applies, and the rule having the greatest total weight, or the element with the greatest weight, executed.

The structure of a rule table for a multidimensional array comprising three dimensions, viz., dimensions a, b and c, in accordance with this aspect of the invention is illustrated in FIG. 11. The left side of the table contains elements defining each of the areas within the multidimensional array for which the values are calculated. The right side of the table contains the formulas applicable to calculating the values for these areas. For example, the area to which formula 4 applies is defined by $[a_1, b_1]$. This formula applies, therefore, to all cells within the multidimensional array for which the elements for the first and second dimensions are $a_1$ and $b_1$, regardless of the identity of the element for the third dimension.

The rules are stored within the table in accordance with a hierarchical order. Under this order, a particular applicable formula takes precedence over all other applicable formulas stored below it. The definitions of the areas to which the formulas apply, therefore, may overlap.

In order to determine whether a particular formula applies to a value requested from a multidimensional array, the elements corresponding to the value initially are compared against the elements of the table. For example, for the rule table illustrated in FIG. 11, if the elements corresponding to a requested value are $a_1$, $b_1$ and $c_6$ for dimensions a, b and c, respectively, formula 2 applies. On the other hand, if these elements are $a_1$, $b_1$ and $c_9$, formula 3 applies. If these elements are $a_1$ and $b_1$, however, and do not include either $c_4$, $c_6$ or $c_9$, then formula 4 applies. Formula 4 applies to all cells within the array for which the elements for dimensions a and b are $a_1$ and $b_1$, respectively, regardless of the identity of the element for the third dimension. Since rule 4 is stored below rules 1, 2 and 3, however, which also apply to cells for which the elements for dimension a and b are $a_1$ and $b_1$, but for which the element for dimension c is significant, rule 1, 2 or 3 is applied before rule 4.

If a particular formula is found applicable, the formula is executed, and the calculated value is returned and displayed to the user. The particular calculation depends upon the operations defined by the formula and the elements corresponding to the requested value. In performing the calculation, the formula may request other values from the multidimensional array. These other values may be uncalculated values or they may be values which are calculated in accordance with other formulas in the rule table. The elements corresponding to all such requested values, therefore, are compared against the rule table in the same manner as the elements corresponding to the initially requested value. The process, therefore, is reiterative and continues until the calculated value is determined.

If no formula applies to the elements corresponding to a requested value, these elements then are directed to the portion of the computer's database storing uncalculated values for the multidimensional array. The elements are compared against the elements defining the values stored within this database to determine whether a value exists within the database corresponding to the elements. This comparison is effected in accordance with one of the schemes described above.

Figure 12:
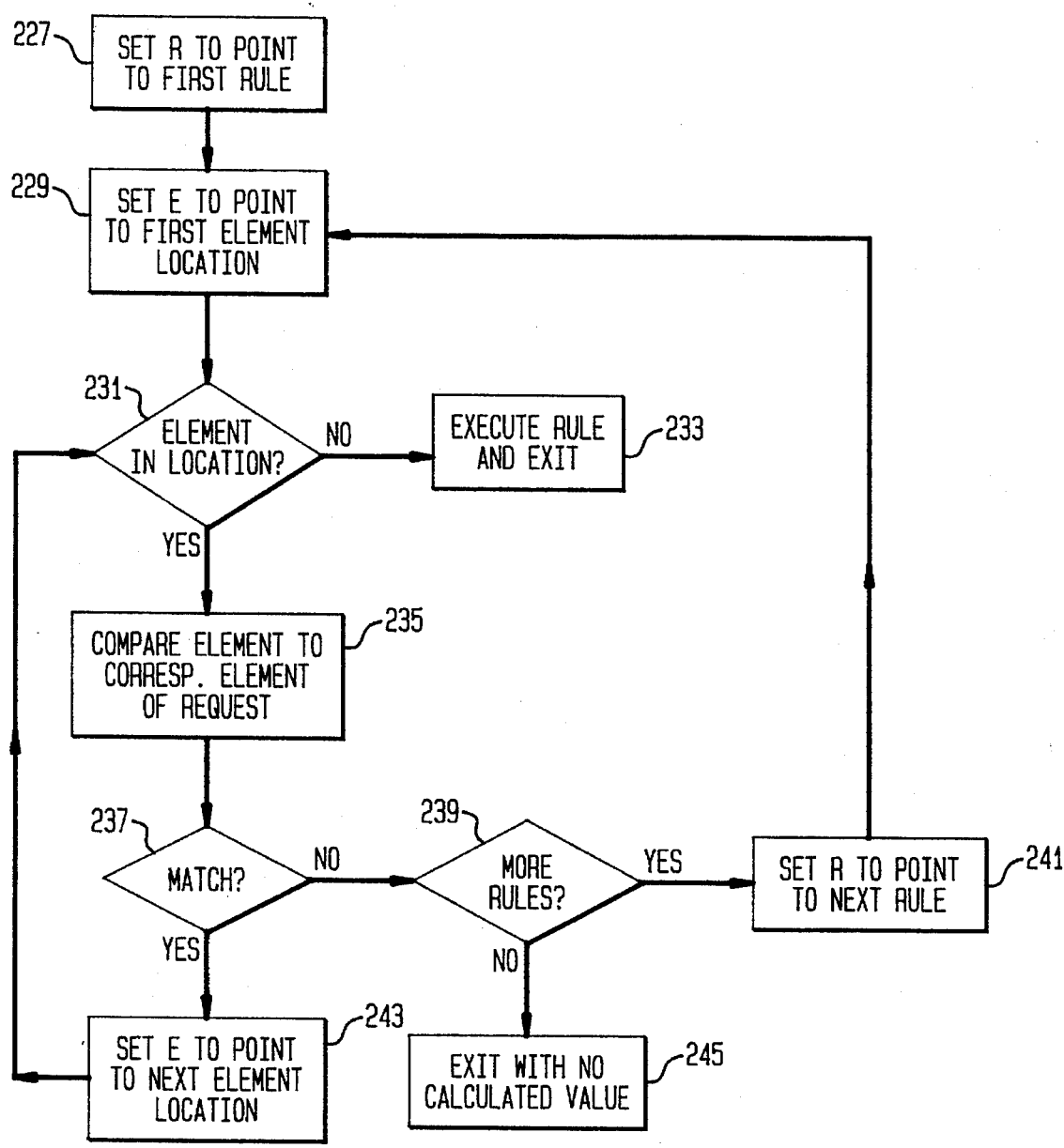
FIG. 12 is a flow diagram of the steps executed by a computer for retrieving calculated values from a rule table in accordance with the present invention.

FIG. 12 is flow diagram of the steps executed by a computer for determining whether a rule, stored within a rule table such as that illustrated in FIG. 11, applies to a particular request for a value from a multidimensional array. The elements corresponding to the value are determined, and a database-pointer R is set, at block 227, to point to the first rule at the top of the rule table (rule 1). At block 229, a second database-pointer E is set to point to the first storage location for the elements defining the area to which rule 1 applies. At decisional block 231, the program determines whether an element exists within this location.

If an element exists within the first storage location, the program advances to block 235 where this element is compared against the element of the request which corresponds to the dimension of the element found in this location. The program then advances to decisional block 237 where a determination is made whether these elements match.

If the elements do not match, the program advances to decisional block 239 where the program determines whether more rules exist for examination. If all rules have been examined, the program proceeds to block 245 where an indication of the absence of a calculated value is returned, and the program terminates. In a subsequent program, the elements corresponding to the requested value then are examined against the elements defining the uncalculated values of the array stored within the computer's database.

On the other hand, if at decisional block 239 more rules exist in the table, the program advances to block 241 where database-pointer R is set to point to the next rule in the table. The program then returns to block 229.

If at decisional block 237, on the other hand, the examined element of the rule matches the corresponding element of the request, the program advances to block 243 where database-pointer E is set to point to the next storage location for the elements defining the area for which rule 1 applies. The program then returns to decisional block 231 where the program determines whether an element exists in this location. If no element exists in this location, the program advances to block 233 where the operations defined by the rule are executed. The program then terminates.

I claim:

1. A computer-implemented method for storing within a database of a computer a series of database-pointers for values of a multidimensional array, said database-pointers corresponding to elements for said values with respect to dimensions of said array, at least one of said elements having no corresponding dabatase pointer, said method comprising the steps of:

(a) establishing a storage node within said database, said storage node being associated with one of said dimensions, said one dimension having N elements;

(b) allocating a storage location within said storage node;

(c) storing one of said database-pointers within said storage location;

(d) causing said one database-pointer to point to a second storage node within said database, said second storage node being associated with a second one of said dimensions, said second dimension having M elements;

(e) establishing a sub-storage area within said database, said sub-storage area being associated with said storage node and having N sub-storage locations, each of said N sub-storage locations corresponding to one of said N elements;

(f) storing a first indicium within a first sub-storage location of said sub-storage area, said first sub-storage location corresponding to a first element of said one dimension and said first indicium identifying said one database-pointer as corresponding to said first element; and (g) storing a second indicium within a second substorage location of said substorage area, said second substorage location corresponding to a second element of said one dimension and said second indicium indicating that no database-pointer corresponds to said second element.

2. A computer-implemented method as in claim 1, further comprising:

(a) allocating a storage location within said second storage node;

(b) storing a second one of said database-pointers within said storage location of said second storage node;

(c) causing said second database-pointer to point to a third storage node within said database, said third storage node being associated with a third one of said dimensions;

(d) establishing a second sub-storage area within said database, said second sub-storage area being associated with said second storage node and having M substorage locations, each of said M sub-storage locations corresponding to one of said M elements;

(e) storing a third indicium within a sub-storage location of said second sub-storage area, said sub-storage location of said second sub-storage area corresponding to an element of said second dimension and said third indicium identifying said second database-pointer as corresponding to said element of said second dimension.

3. A computer-implemented method for storing within a database of a computer a series of database-pointers for values of a multidimensional array, said series of database-pointers corresponding to an element of a dimension of said array, said method comprising the steps of:

(a) determining a series of digits or symbols representative of said element in a number system having a base M, wherein M is a whole number and such that each of said digits or symbols corresponds to one of a series of whole-number powers of M;

(b) establishing a series of storage nodes within said database, each of said storage nodes being associated with one of said powers of M;

(c) allocating a storage location within each of said storage nodes;

(d) storing within each of said storage locations one of said database-pointers;

(e) associating each of said database-pointers with the digit or symbol which corresponds to the power of M with which the storage node containing the database-pointer is associated;

(f) setting each of said database-pointers, associated with a digit or symbol corresponding to a power of M greater than zero, to point to the storage node containing the database-pointer associated with the digit or symbol corresponding to the power of M which is next smaller in said series of powers of M; and (g) setting the database-pointer associated with the digit or symbol corresponding to $M^0$ to point to a storage node corresponding to a second dimension of said array.

4. A computer-implemented method as in claim 3, further comprising selecting M from the group consisting of numbers whose log to the base two is a whole number.

5. A computer-implemented method as in claim 3, further comprising setting M at 16.

6. A computer-implemented method as in claim 3, further comprising:

(a) determining in said number system a second series of digits or symbols representative of an element of said second dimension;

(b) establishing a second series of storage nodes within said database, each of said storage nodes of said second series of storage nodes being associated with one of said powers of M;

(c) allocating a storage location within each of said storage nodes of said second series of storage nodes;

(d) storing within each of said storage locations of said second series of storage nodes a database-pointer of a second series of database-pointers, said second series of database-pointers corresponding to said element of said second dimension;

(e) associating each of said database-pointers, of said second series of database-pointers, with the digit or symbol, of said second series of digits or symbols, which corresponds to the power of M with which the storage node containing the database-pointer is associated;

(f) setting each of said database-pointers of said second series of database-pointers, associated with a digit or symbol corresponding to a power of M greater than zero, to point to the storage node of said second series of storage nodes containing the database-pointer associated with the digit or symbol corresponding to the power of M which is next smaller in said series of powers of M; and (g) setting the database-pointer, of said second series of database-pointers, associated with the digit or symbol corresponding to $M^0$ to point to a storage node corresponding to a third dimension of said array.

7. A computer-implemented method as in claim 3, wherein said associating comprises allocating M storage locations within each of said storage nodes, each of said M storage locations corresponding to one of the digits or symbols of said number system, and storing each of said database-pointers in the storage location of said M storage locations which corresponds to the digit or symbol corresponding to the power of M with which the storage node containing the database-pointer is associated.

8. A computer-implemented method as in claim 3, wherein said associating comprises:

(a) establishing a series of substorage areas within said database, each of said substorage areas being associated with one of said storage nodes and having M sub-storage locations, each of said M sub-storage locations corresponding to one of the digits or symbols of said number system; and (b) storing an indicium within the sub-storage location of each of said sub-storage areas which corresponds to the digit or symbol corresponding to the power of M with which the storage node, with which the sub-storage area is associated, is associated.

9. A computer-implemented method as in claim 8, further comprising establishing a series of level-storage areas within said computer database, each of said level-storage areas being associated with one of said storage nodes, and storing within each of said level-storage areas a second indicium indicating the power of M with which the storage node, with which the level-storage area is associated, is associated.

10. A computer-implemented method for storing within the database of a computer a table of rules for providing calculated values of a multidimensional array, said calculated values being calculated from other values of said array, said method comprising:

(a) storing a list of definitions within said database, each of said definitions identifying an area within said array corresponding to one or more of said calculated values, at least some of said definitions identifying, at least in part, the same areas;

(b) storing a series of formulas within said database, each of said formulas corresponding to one of said definitions and providing an arithmetic or logical operation for calculating calculated values associated with the area identified by said definition;

(c) providing said definitions with a hierarchial scheme for determining which of said formulas corresponding to said definitions is applied to calculate calculated values associated with said same areas.

11. A computer-implemented method as in claim 10, wherein said storing of said definitions comprises storing, for each of said definitions, an element from each dimension of said array, except for those dimensions of said array for which the area identified by said definition encompasses all elements.

12. A computer-implemented method as in claim 11, wherein said storing of said definitions comprises storing no elements for each of those dimensions of said array for which the area identified by said definition encompasses all elements.

13. A computer-implemented method as in claim 10, wherein said storing of said formulas comprises storing, for at least some of said formulas, elements of said array identifying said other values.

14. A computer-implemented method as in claim 10, wherein said providing said definitions with a hierarchial scheme comprises assigning precedence to the formula corresponding to the definition, among said definitions identifying, at least in part, said same areas, that is first in said list.

15. A computer-implemented method as in claim 10, wherein said providing said definitions with a hierarchial scheme comprises assigning a weight to each of said definitions, among said definitions identifying, at least in part, said same areas, and assigning precedence to the formula corresponding to the definition assigned the greatest weight.

16. A computer-implemented method as in claim 10, wherein said providing said definitions with a hierarchial scheme comprises assigning a weight to at least some of said elements of each of said definitions, among said definitions identifying, at least in part, said same areas, and assigning precedence to the formula corresponding to the definition having an individual element, or elements in total, assigned the greatest weight.

17. A computer system for storing within a database of a computer a series of database-pointers for values of a multidimensional array, said database-pointers corresponding to elements for said values with respect to dimensions of said array, at least one of said elements having no corresponding database-pointer, said system comprising:

(a) means for establishing a storage node within said database, said storage node being associated with one of said dimensions, said one dimension having N elements;

(b) means for allocating a storage location within said storage node;

(c) means for storing one of said database-pointers within said storage location;

(d) means for causing said one database-pointer to point to a second storage node within said database, said second storage node being associated with a second one of said dimensions, said second dimension having M elements;

(e) means for establishing a sub-storage area within said database, said sub-storage area being associated with said storage node and having N sub-storage locations, each of said N sub-storage locations corresponding to one of said N elements;

(f) means for storing a first indicium within a first sub-storage location of said sub-storage area, said first sub-storage location corresponding to a first element of said one dimension and said first indicium identifying said one database-pointer as corresponding to said element; and (g) means for storing a second indicium within a second substorage location of said substorage area, said second substorage location corresponding to a second element of said one dimension and said second indicium indicating that no database-pointer corresponds to said second element.

18. A computer system as in claim 17, further comprising:

(a) means for allocating a storage location within said second storage node;

(b) means for storing a second one of said database-pointers within said storage location of said second storage node;

(c) means for causing said second database-pointer to point to a third storage node within said database, said third storage node being associated with a third one of said dimensions;

(d) means for establishing a second sub-storage area within said database, said second sub-storage area being associated with said second storage node and having M sub-storage locations, each of said M sub-storage locations corresponding to one of said M elements;

(e) means for storing a third indicium within a sub-storage location of said second sub-storage area, said sub-storage location of said second sub-storage area corresponding to an element of said second dimension and said third indicium identifying said second database-pointer as corresponding to said element of said second dimension.

19. A computer system for storing within a database of a computer a series of database-pointers for values of a multidimensional array, said series of database-pointers corresponding to an element of a dimension of said array, said system comprising:

(a) means for determining a series of digits or symbols representative of said element in a number system having a base M, wherein M is a whole number and such that each of said digits or symbols corresponds to one of a series of whole-number powers of M;

(b) means for establishing a series of storage nodes within said database, each of said storage nodes being associated with one of said powers of M;

(c) means for allocating a storage location within each of said storage nodes;

(d) means for storing within each of said storage locations one of said database-pointers;

(e) means for associating each of said database-pointers with the digit or symbol which corresponds to the power of M with which the storage node containing the database-pointer is associated;

(f) means for setting each of said database-pointers, associated with a digit or symbol corresponding to a power of M greater than zero, to point to the storage node containing the database-pointer associated with the digit or symbol corresponding to the power of M which is next smaller in said series of powers of M; and (g) means for setting the database-pointer associated with the digit or symbol corresponding to $M^0$ to point to a storage node corresponding to a second dimension of said array.

20. A computer system as in claim 19, further comprising means for selecting M from the group consisting of numbers whose log to the base two is a whole number.

21. A computer system as in claim 19, further comprising means for setting M at 16.

22. A computer system as in claim 19, further comprising:

(a) means for determining in said number system a second series of digits or symbols representative of an element of said second dimension;

(b) means for establishing a second series of storage nodes within said database, each of said storage nodes of said second series of storage nodes being associated with one of said powers of M;

(c) means for allocating a storage location within each of said storage nodes of said second series of storage nodes;

(d) means for storing within each of said storage locations of said second series of storage nodes a database-pointer of a second series of database-pointers, said second series of database-pointers corresponding to said element of said second dimension;

(e) means for associating each of said database-pointers, of said second series of database-pointers, with the digit or symbol, of said second series of digits or symbols, which corresponds to the power of M with which the storage node containing the database-pointer is associated;

(f) means for setting each of said database-pointers of said second series of database-pointers, associated with a digit or symbol corresponding to a power of M greater than zero, to point to the storage node of said second series of storage nodes containing the database-pointer associated with the digit or symbol corresponding to the power of M which is next smaller in said series of powers of M; and (g) means for setting the database-pointer, of said second series of database-pointers, associated with the digit or symbol corresponding to $M^0$ to point to a storage node corresponding to a third dimension of said array.

23. A computer system as in claim 19, wherein said means for associating comprises means for allocating M storage locations within each of said storage nodes, each of said M storage locations corresponding to one of the digits or symbols of said number system, and means for storing each of said database-pointers in the storage location of said M storage locations which corresponds to the digit or symbol corresponding to the power of M with which the storage node containing the database-pointer is associated.

24. A computer system as in claim 19, wherein said means for associating comprises:

(a) means for establishing a series of sub-storage areas within said database, each of said sub-storage areas being associated with one of said storage nodes and having M sub-storage locations, each of said M sub-storage locations corresponding to one of the digits or symbols of said number system; and (b) means for storing an indicium within the sub-storage location of each of said sub-storage areas which corresponds to the digit or symbol corresponding to the power of M with which the storage node, with which the sub-storage area is associated, is associated.

25. A computer-implemented method as in claim 24, further comprising means for establishing a series of level-storage areas within said computer database, each of said level-storage areas being associated with one of said storage nodes, and means for storing within each of said level-storage areas a second indicium indicating the power of M with which the storage node, with which the level-storage area is associated, is associated.

26. A computer system for storing within the database of a computer a table of rules for providing calculated values of a multidimensional array, said calculated values being calculated from other values of said array, said system comprising:

(a) means for storing a list of definitions within said database, each of said definitions identifying an area within said array corresponding to one or more of said calculated values, at least some of said definitions identifying, at least in part, the same areas;

(b) means for storing a series of formulas within said database, each of said formulas corresponding to one of said definitions and providing an arithmetic or logical operation for calculating calculated values associated with the area identified by said definition;

(c) means for providing said definitions with a hierarchial scheme for determining which of said formulas corresponding to said definitions is applied to calculate calculated values associated with said same areas.

27. A computer system as in claim 26, wherein said means for storing of said definitions comprises means for storing, for each of said definitions, an element from each dimension of said array, except for those dimensions of said array for which the area identified by said definition encompasses all elements.

28. A computer system as in claim 27, wherein said means for storing of said definitions comprises means for storing no elements for each of those dimensions of said array for which the area identified by said definition encompasses all elements.

29. A computer system as in claim 26, wherein said means for storing of said formulas comprises means for storing, for at least some of said formulas, elements of said array identifying said other values.

30. A computer system as in claim 26, wherein said means for providing said definitions with a hierarchial scheme comprises means for assigning precedence to the formula corresponding to the definition, among said definitions identifying, at least in part, said same areas, that is first in said list.

31. A computer system as in claim 26, wherein said means for providing said definitions with a hierarchial scheme comprises means for assigning a weight to each of said definitions, among said definitions identifying, at least in part, said same areas, and means for assigning precedence to the formula corresponding to the definition assigned the greatest weight.

32. A computer system as in claim 26, wherein said means for providing said definitions with a hierarchial scheme comprises means for assigning a weight to at least some of said elements of each of said definitions, among said definitions identifying, at least in part, said same areas, and means for assigning precedence to the formula corresponding to the definition having an individual element, or elements in total, assigned the greatest weight.

* * * * *